United States Patent [19]

Slysh

[11] 4,380,013
[45] Apr. 12, 1983

[54] EXPANDABLE PANEL AND TRUSS SYSTEM/ANTENNA/SOLAR PANEL

[75] Inventor: Paul Slysh, San Diego, Calif.

[73] Assignee: General Dynamics Corp./Convair Division, San Diego, Calif.

[21] Appl. No.: 234,830

[22] Filed: Feb. 17, 1981

[51] Int. Cl.³ .......................... H01Q 1/28; H01Q 1/08
[52] U.S. Cl. .................................... 343/753; 343/840; 343/DIG. 2; 244/173
[58] Field of Search ............... 343/840, 912, 915, 753, 343/DIG. 2; 244/173

[56] References Cited

U.S. PATENT DOCUMENTS

| | | | |
|---|---|---|---|
| 3,690,080 | 9/1972 | Dillard | 343/915 |
| 4,015,653 | 3/1977 | Slysh et al. | 244/173 |
| 4,116,258 | 9/1978 | Slysh et al. | 244/173 |
| 4,155,524 | 5/1979 | Marello et al. | 244/173 |

*Primary Examiner*—Eli Lieberman
*Attorney, Agent, or Firm*—John R. Duncan; Frank D. Gilliam

[57] ABSTRACT

Disclosed is an expandable panel and truss structure capable of being stowed in a storage container (canister) for transportation into space and deployed to form structures such as antennas, solar panels or similar space or terrestial structures. The antenna formed comprises the panels stored as hinged pairs (sets) folded in accordian-like fashion together with the expandable trusses and other devices necessary for antenna space operation, such as attitude control and antenna feed. The panel sets are deployed from the canister to form a toroidal ring, circular in cross-section when deployed, for supporting the antenna lens and to form a feed support boom utilizing the canister as part of the antenna structure. The canister is connected to the ring and support boom in the deployed state by the expandable trusses. A fully automatic system is included for deploying the antenna and for holding the antenna structure in its deployed state. By adding a second (back) boom and reflector screen, a paraboloidal antenna is formed.

In a second embodiment, utilizing the same storage and deployment principle but with panel sets which are triangular in cross-section, when deployed, either an offset (asymmetrical) paraboloidal or a feed horn type antenna structure is formed.

In another embodiment of the invention, utilizing the same principle and with panel sets which are triangular in cross-section, when deployed, a solar panel array is formed.

Also disclosed is a foldable truss geostationary platform and package for transfer into a geostationary orbit.

Finally, an alternate mechanism is disclosed in the form of a pantograph for deploying panel sets to form a truss.

41 Claims, 64 Drawing Figures

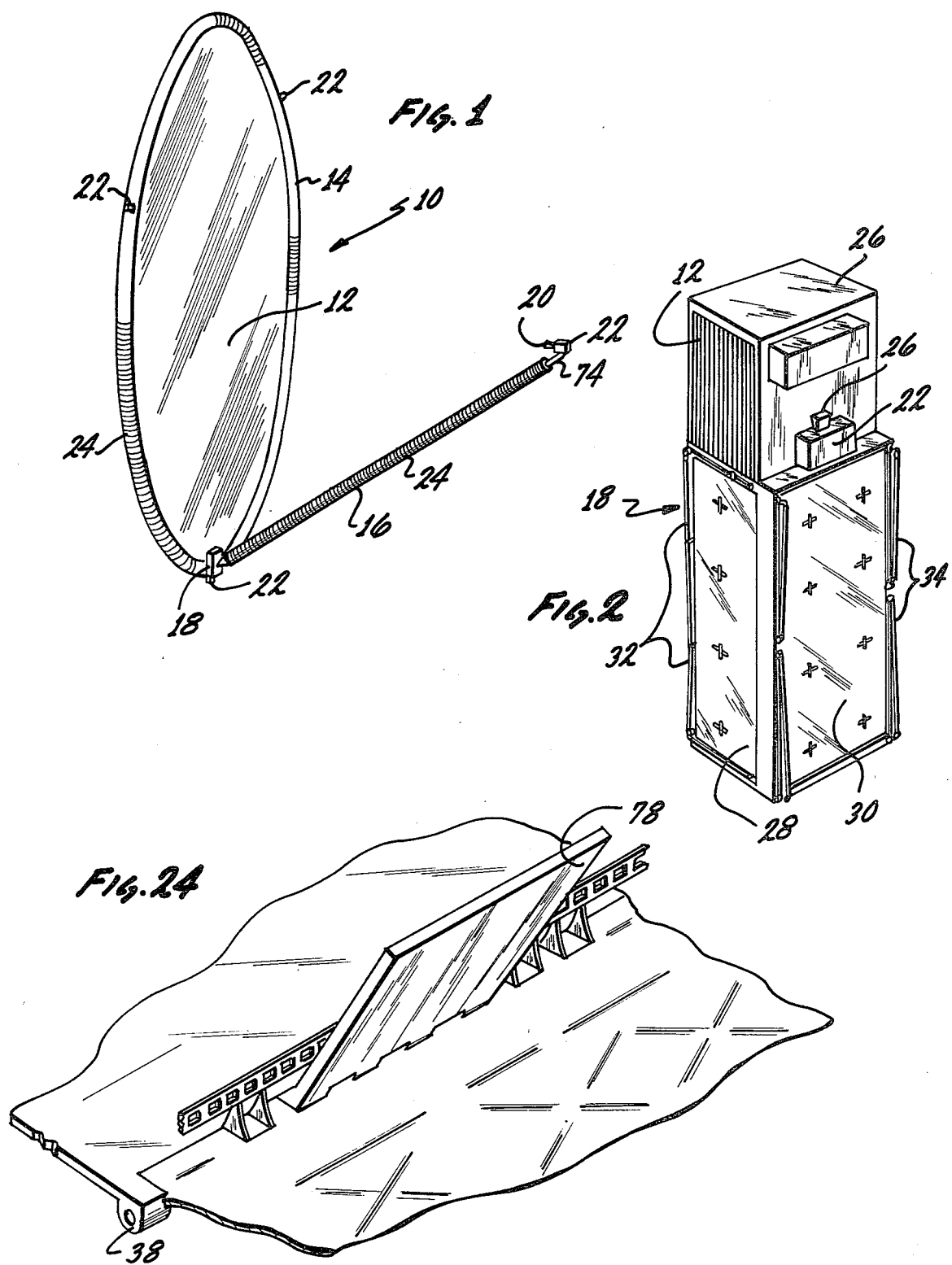

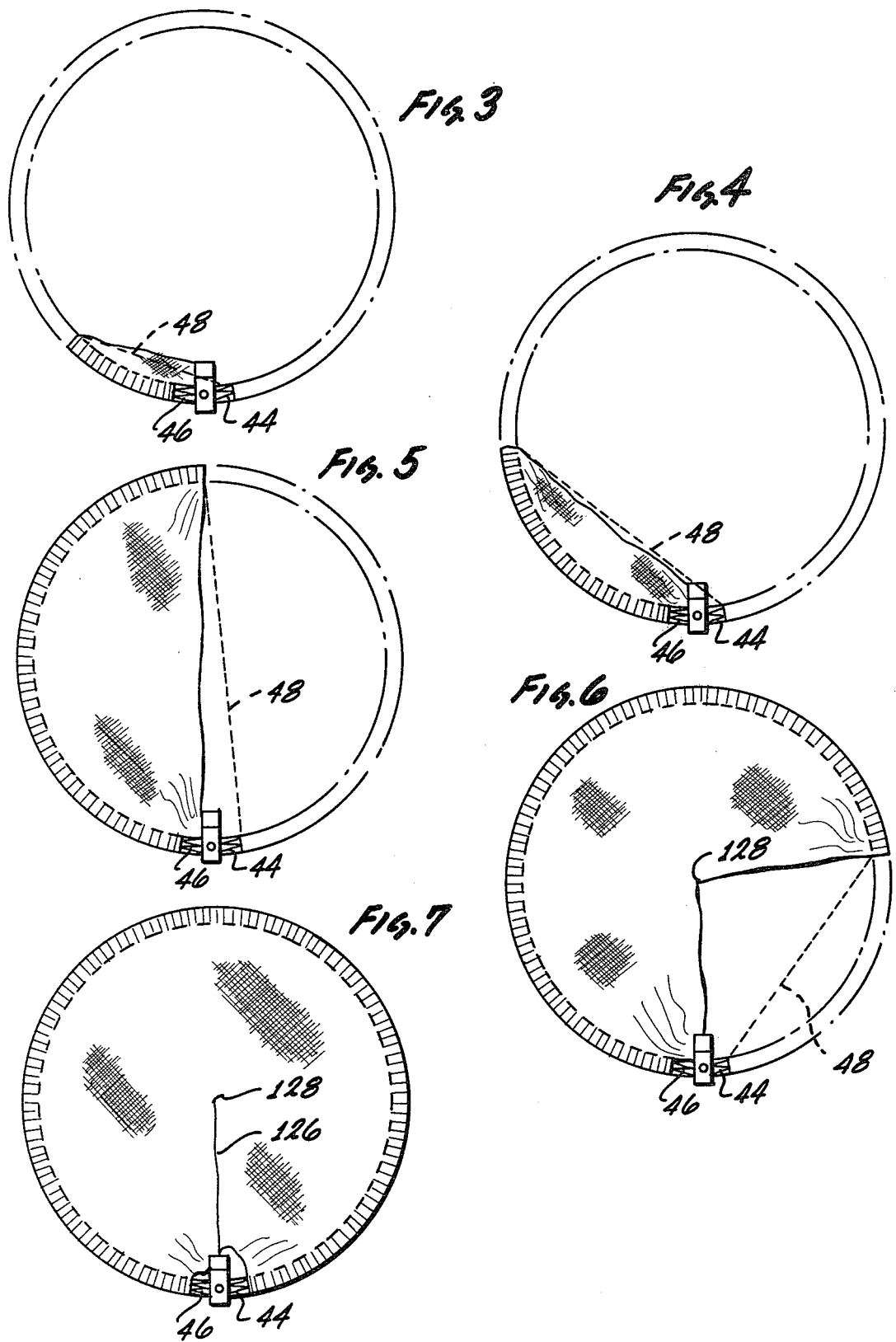

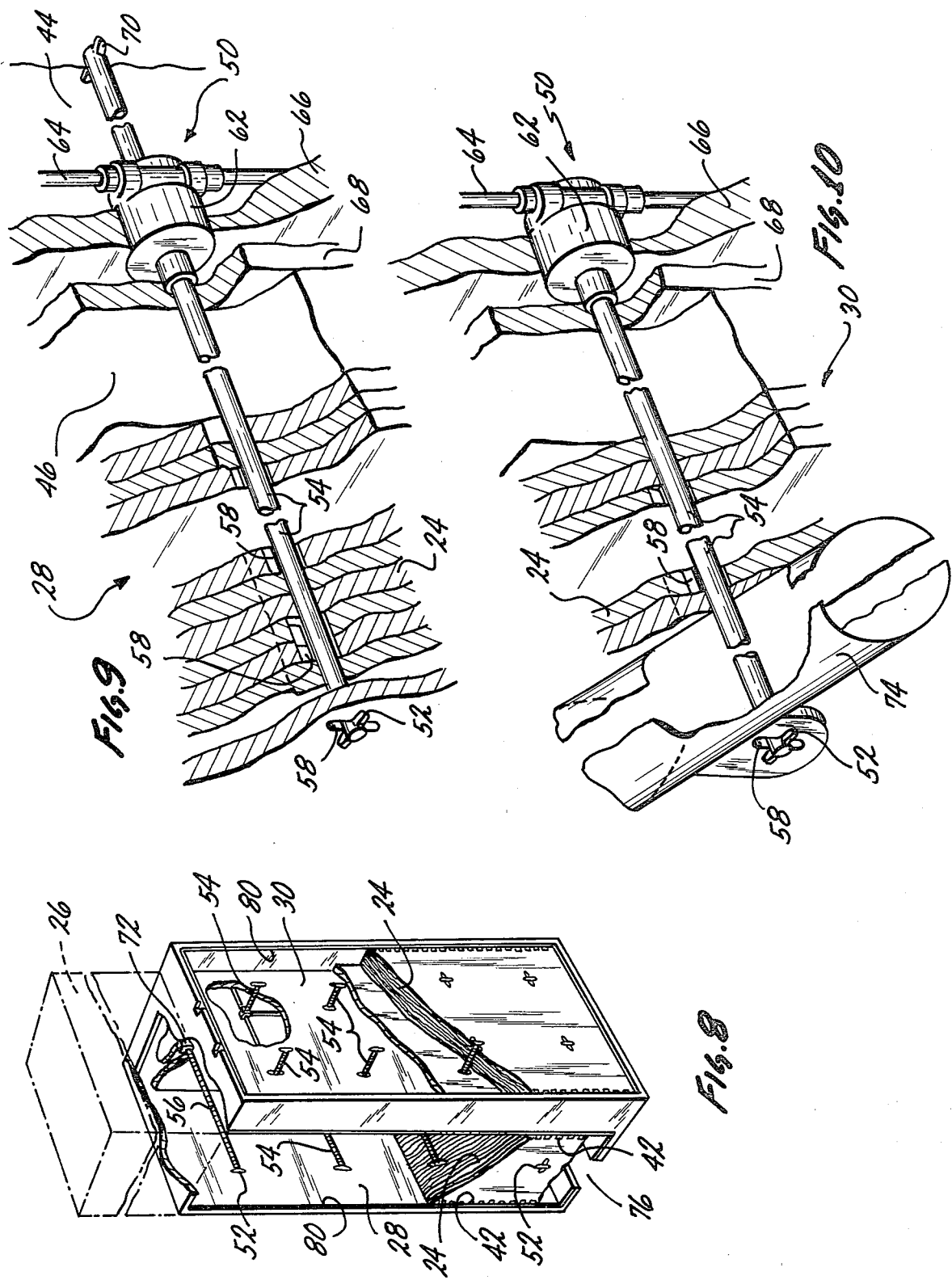

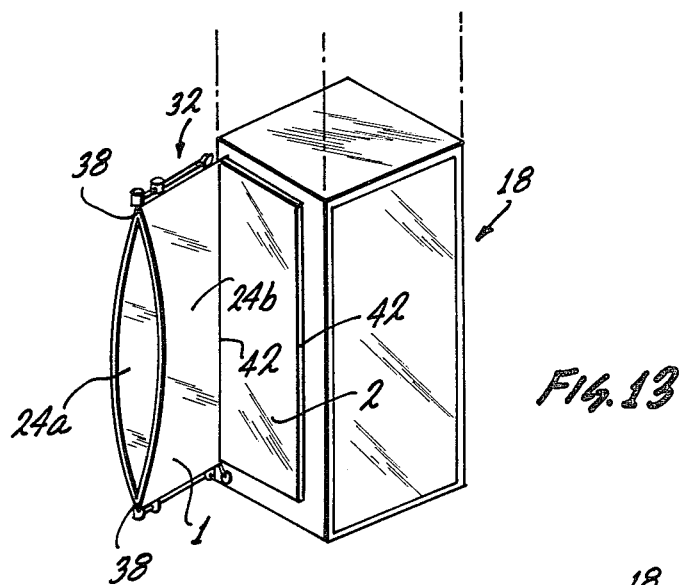
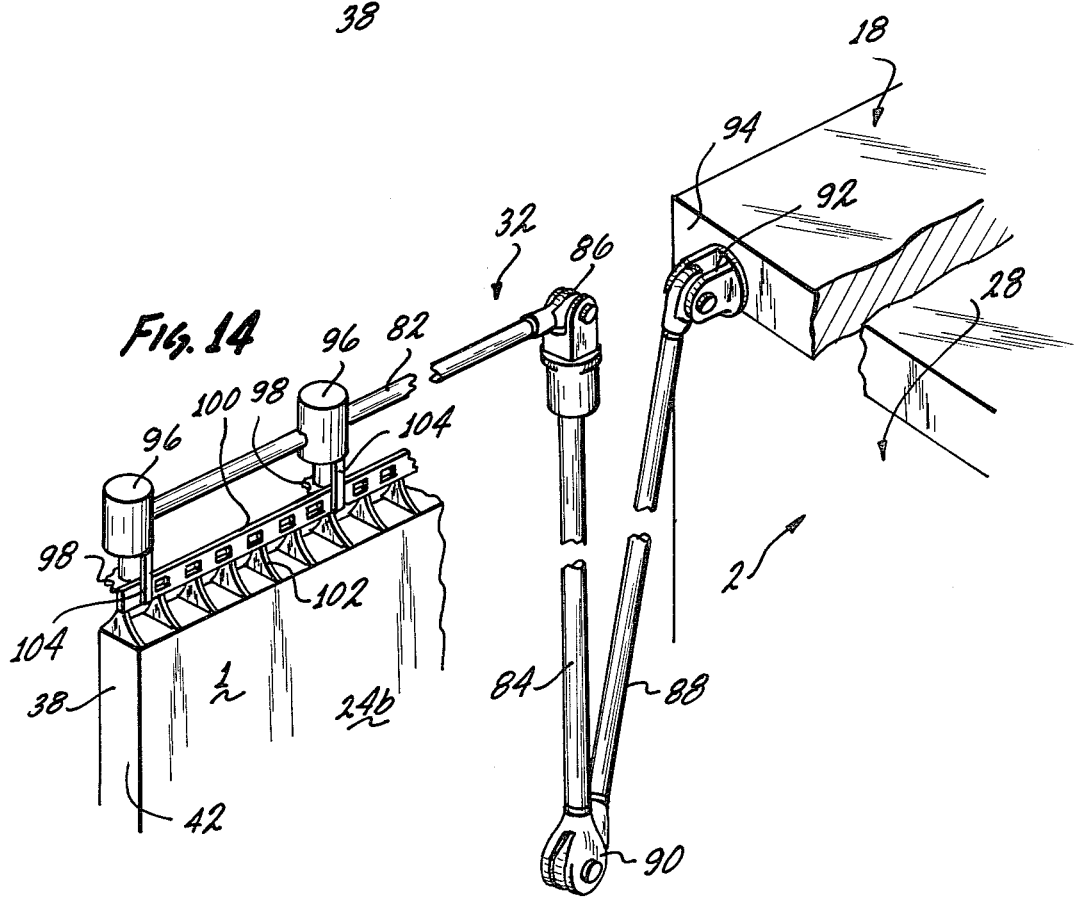

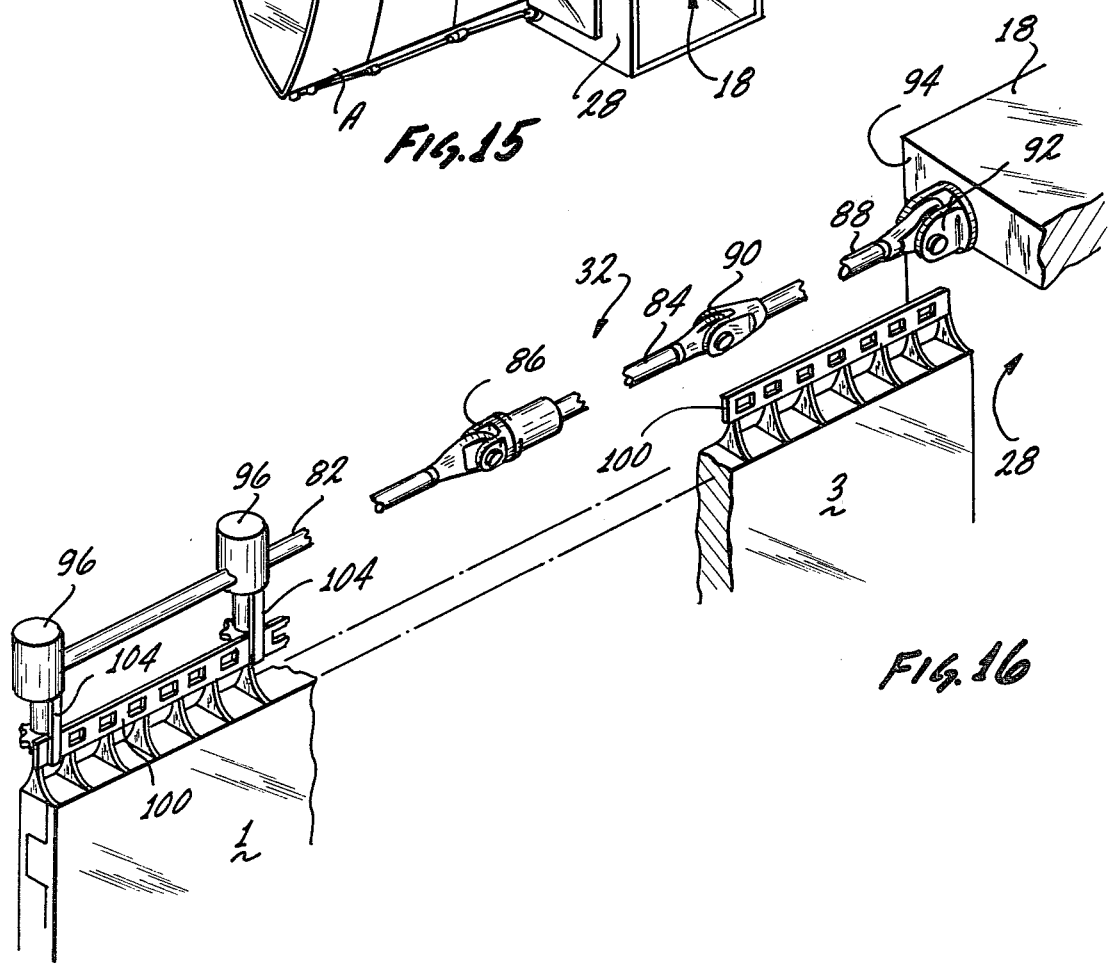

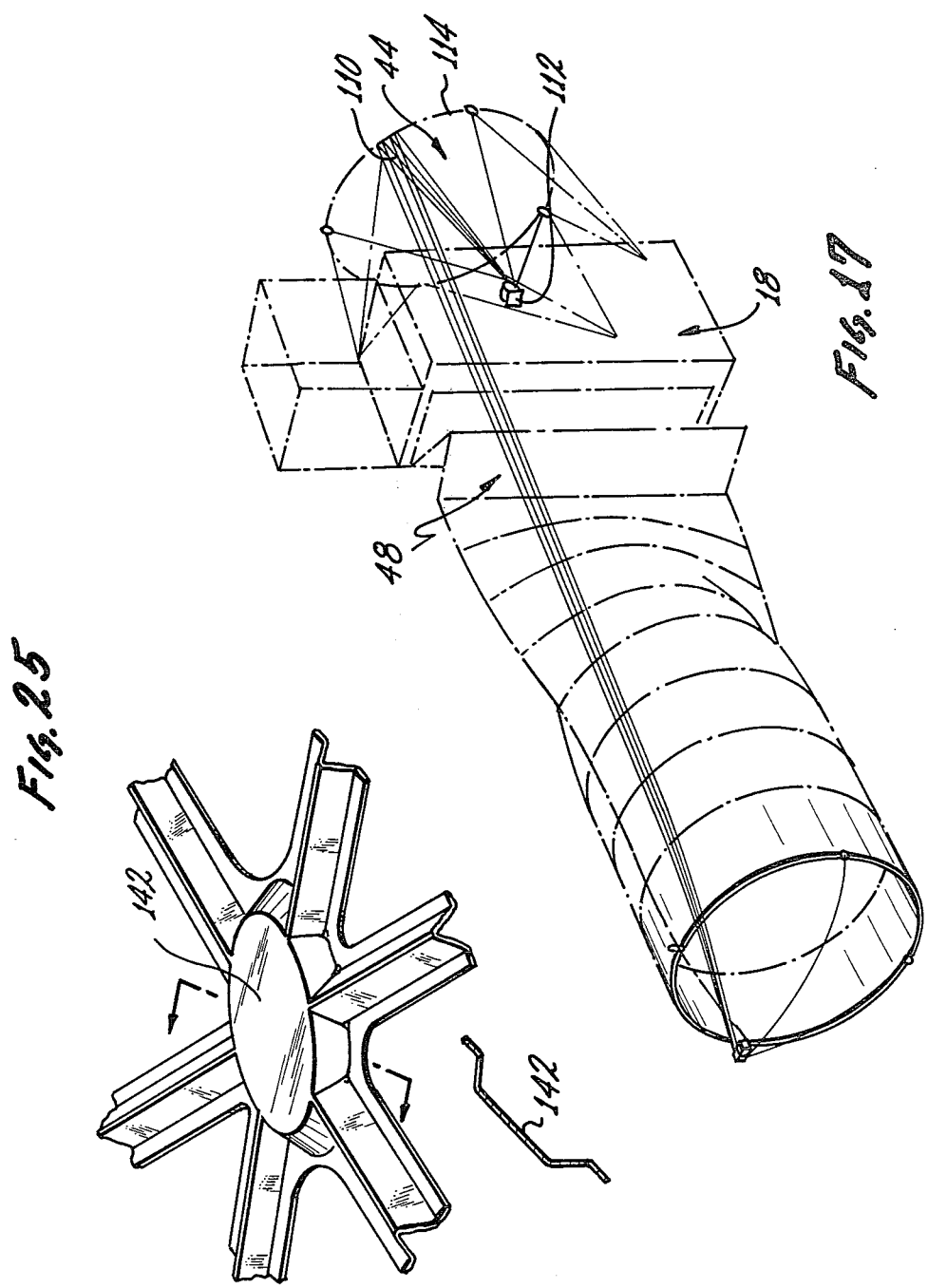

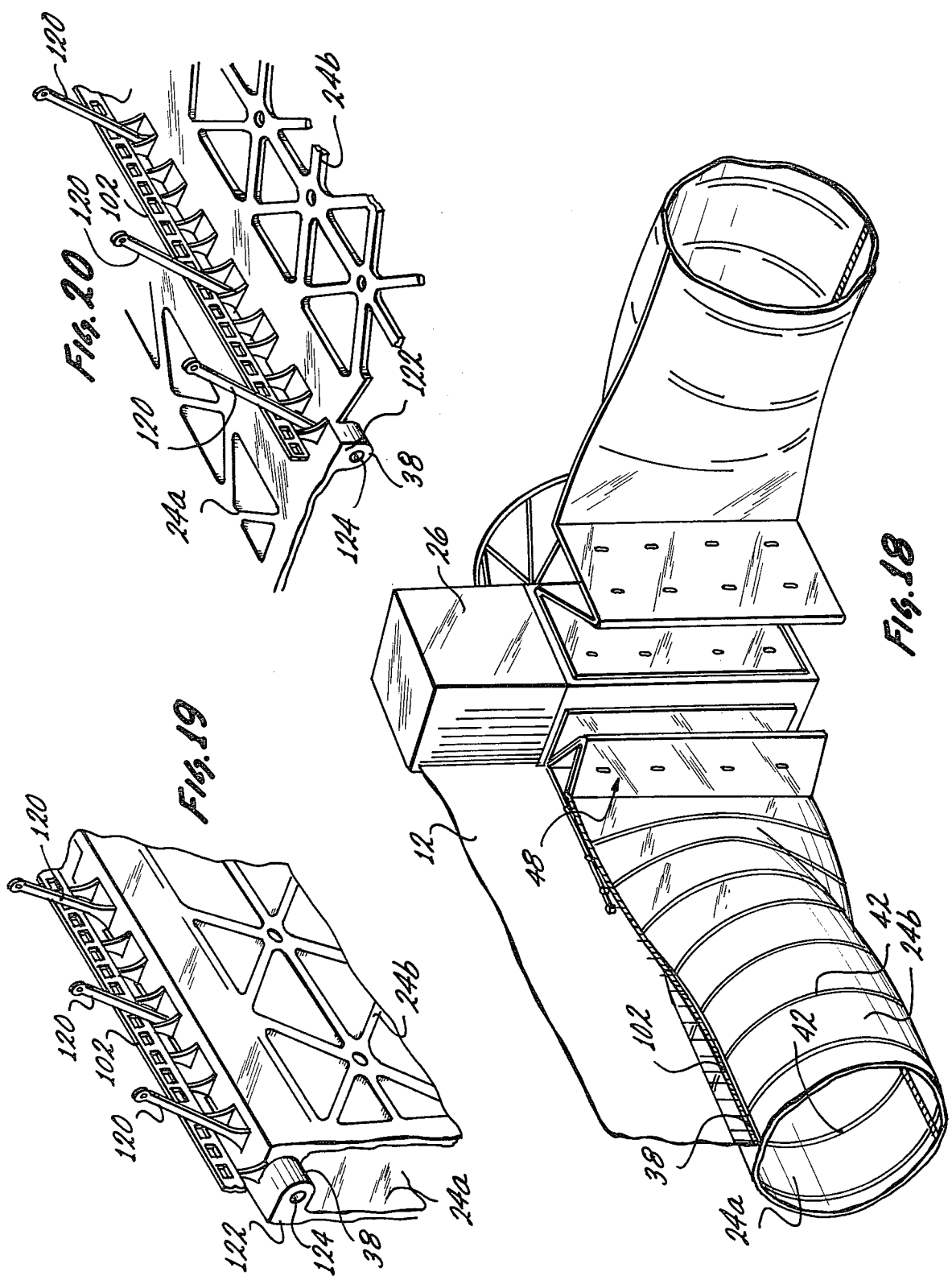

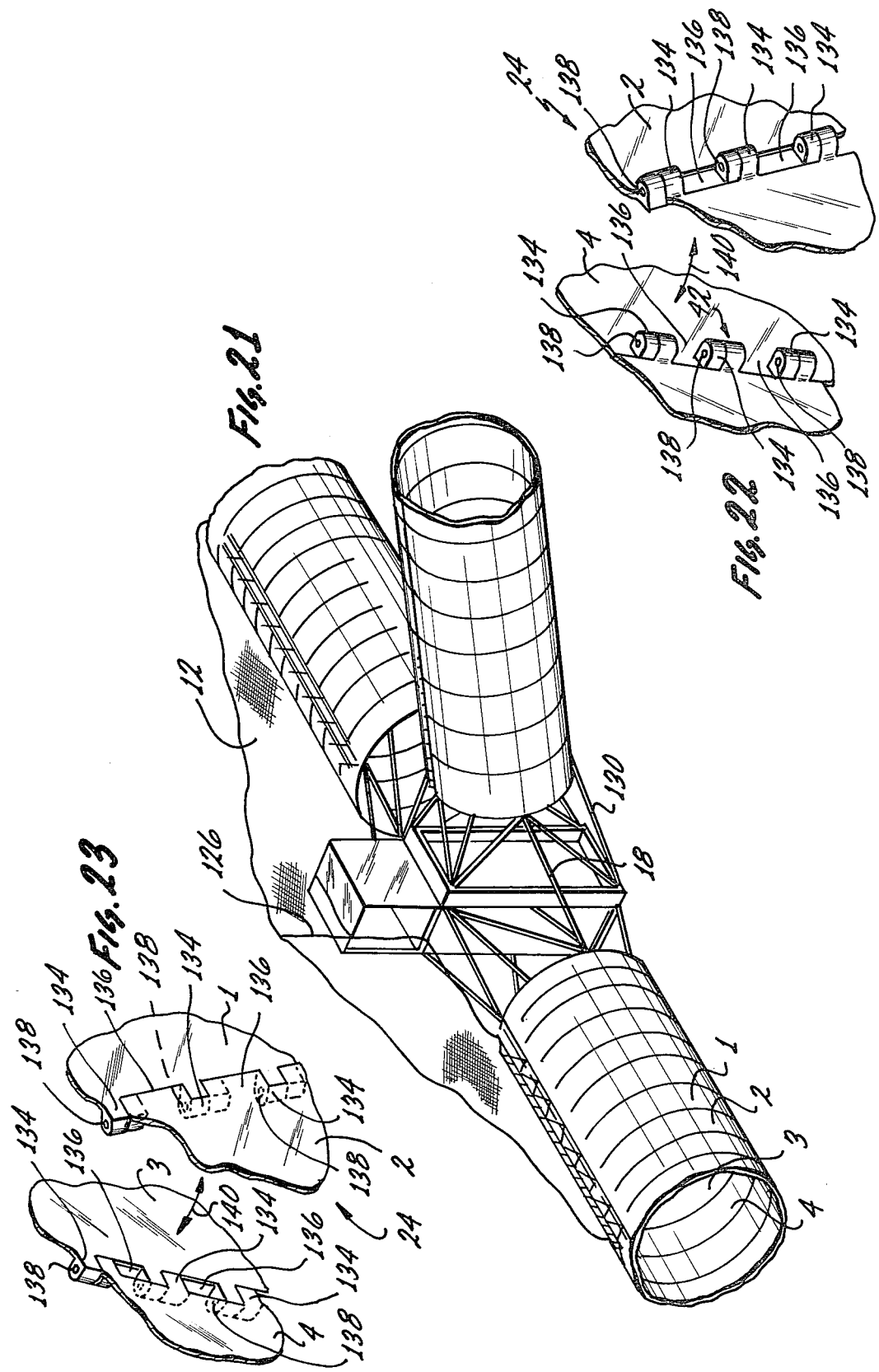

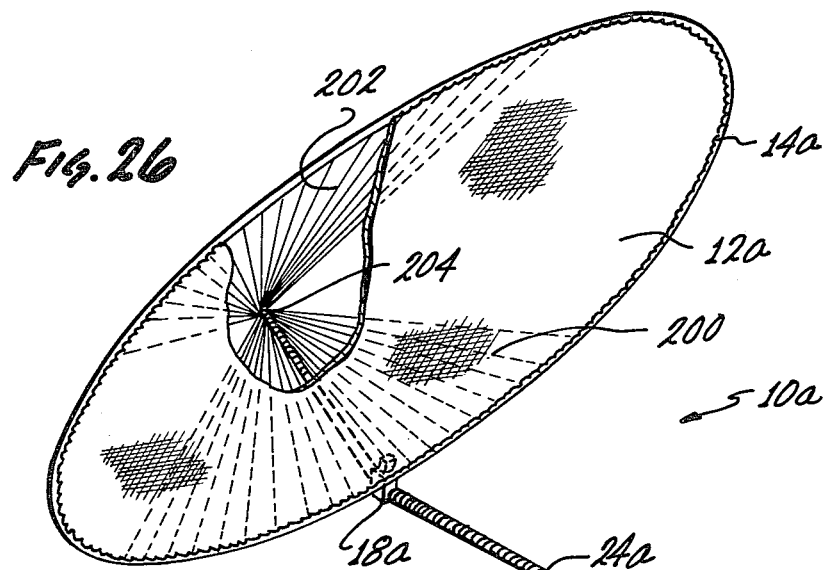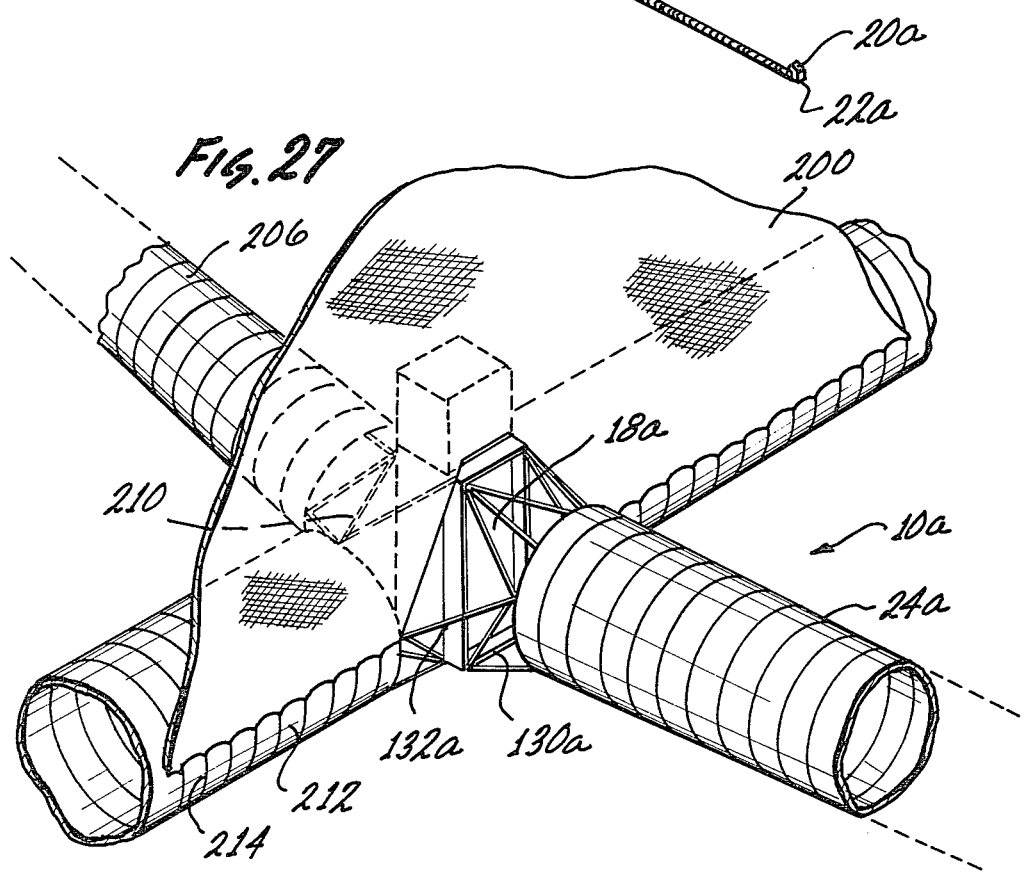

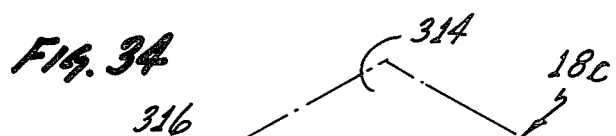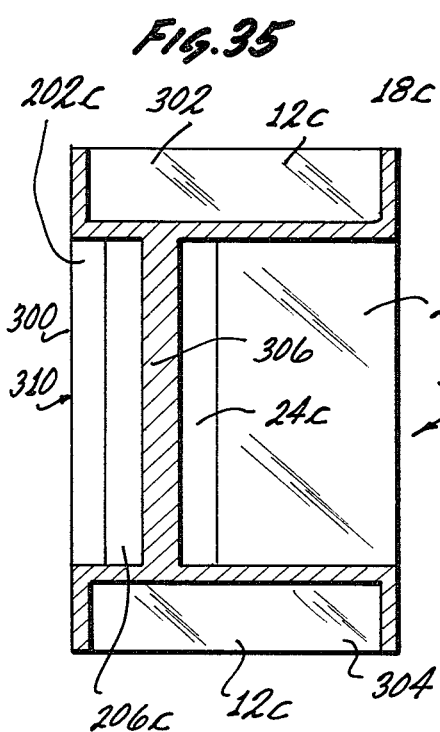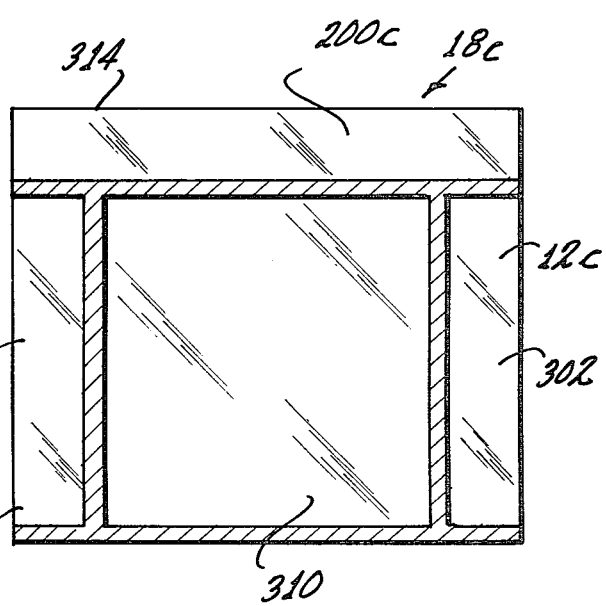

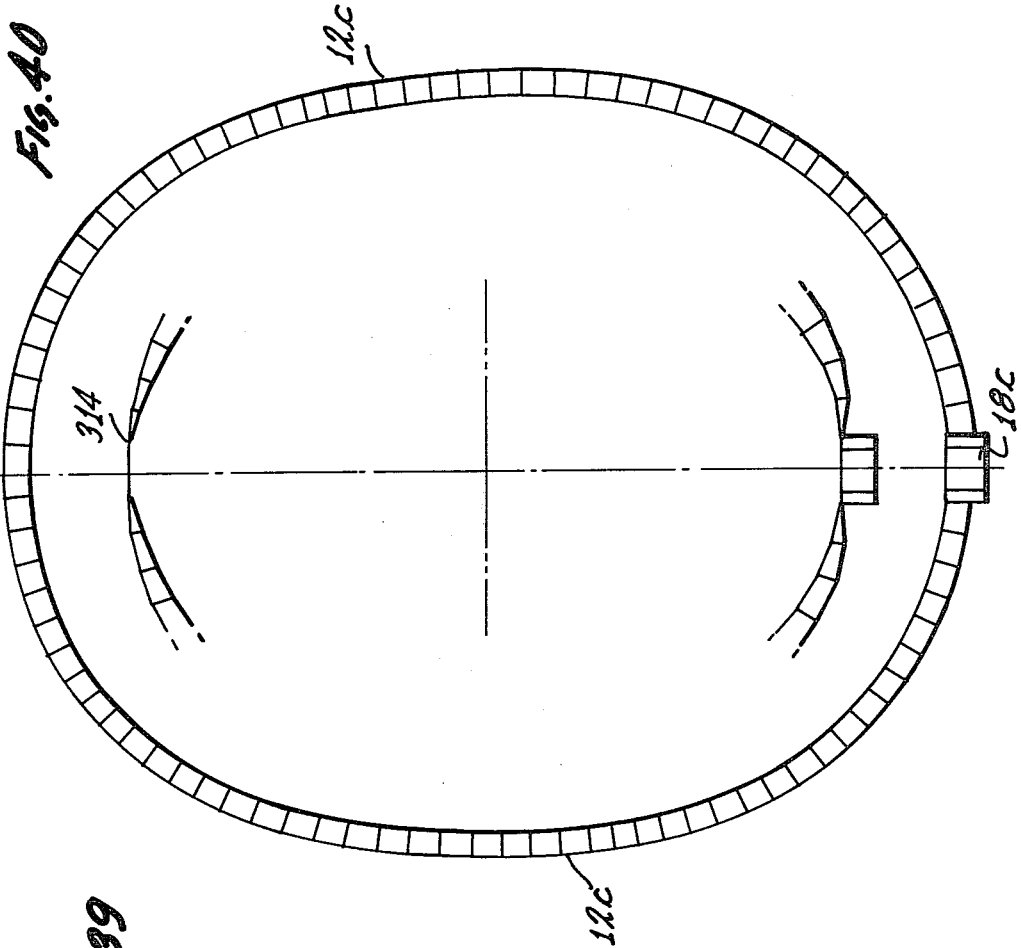
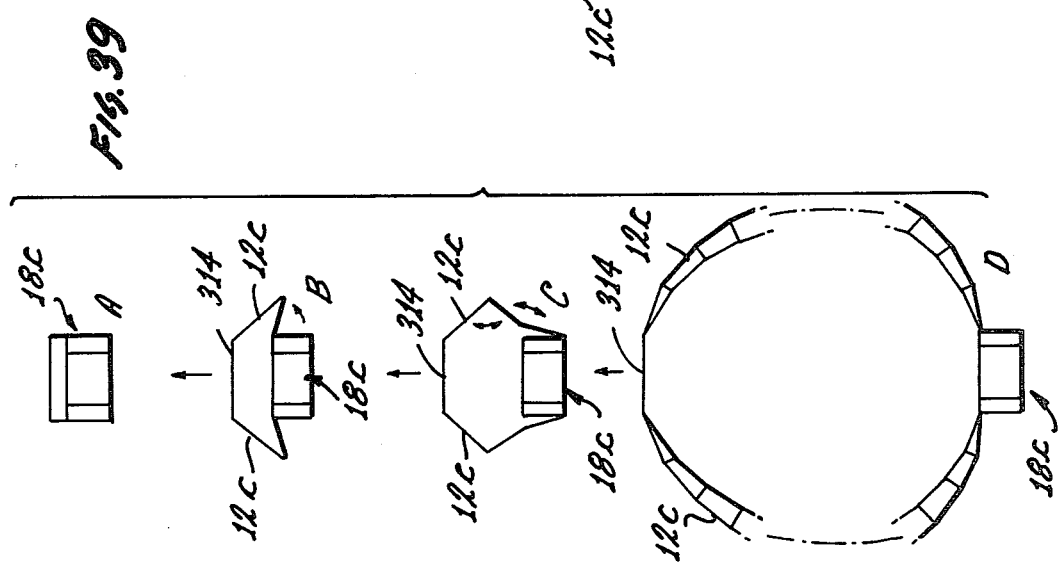

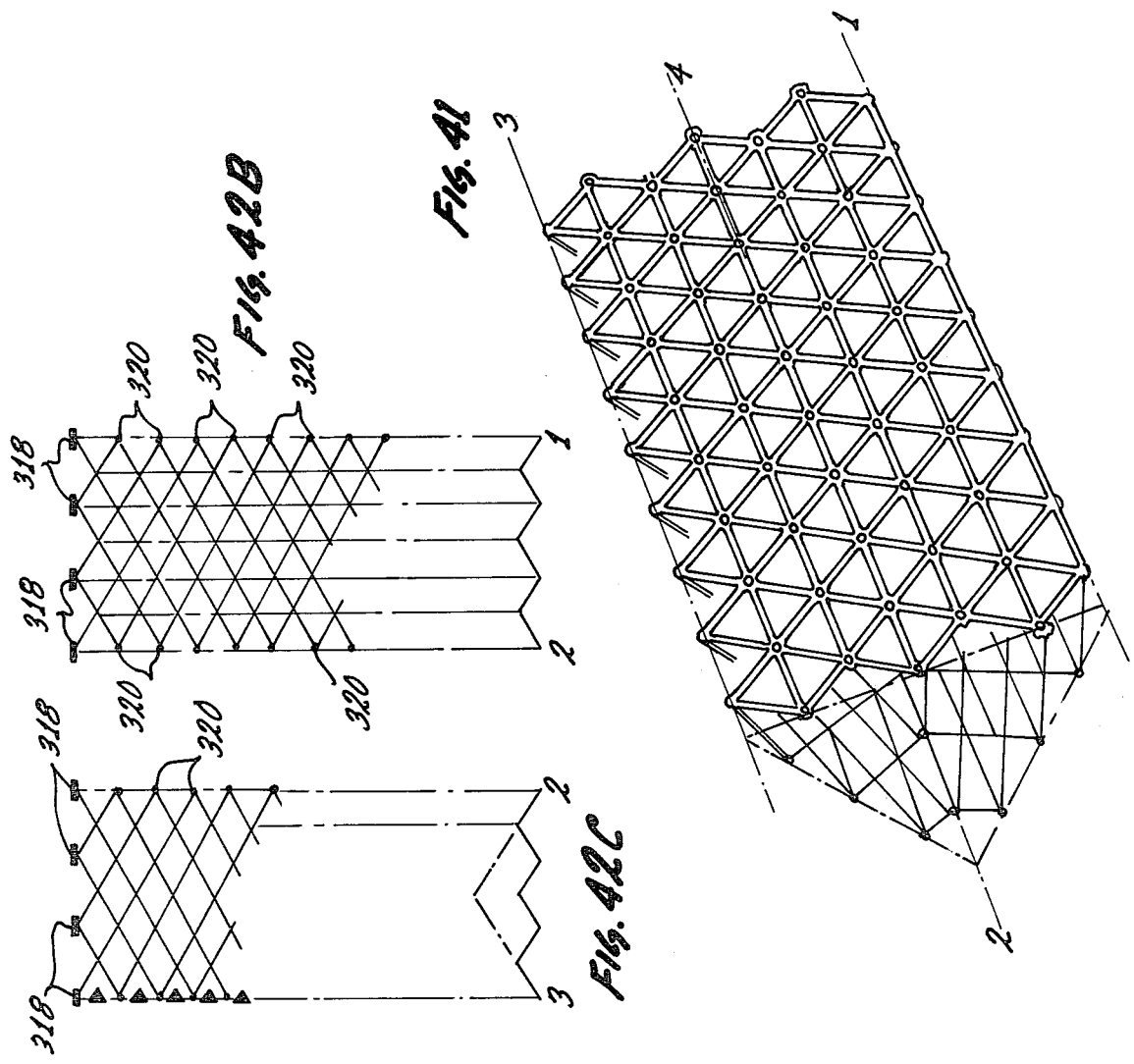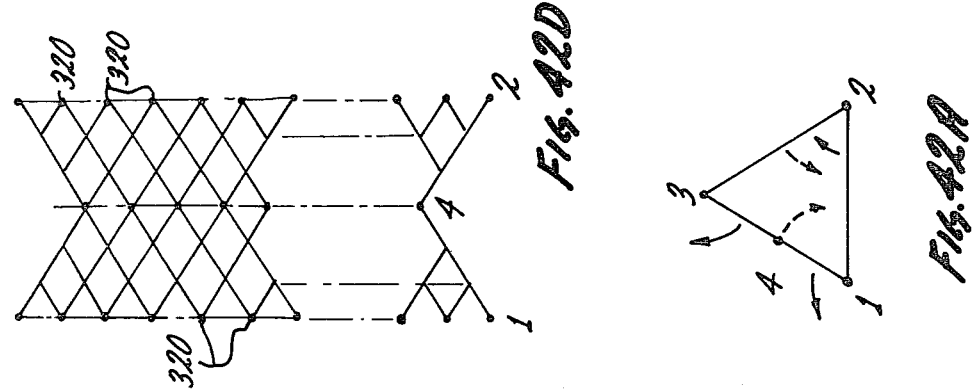

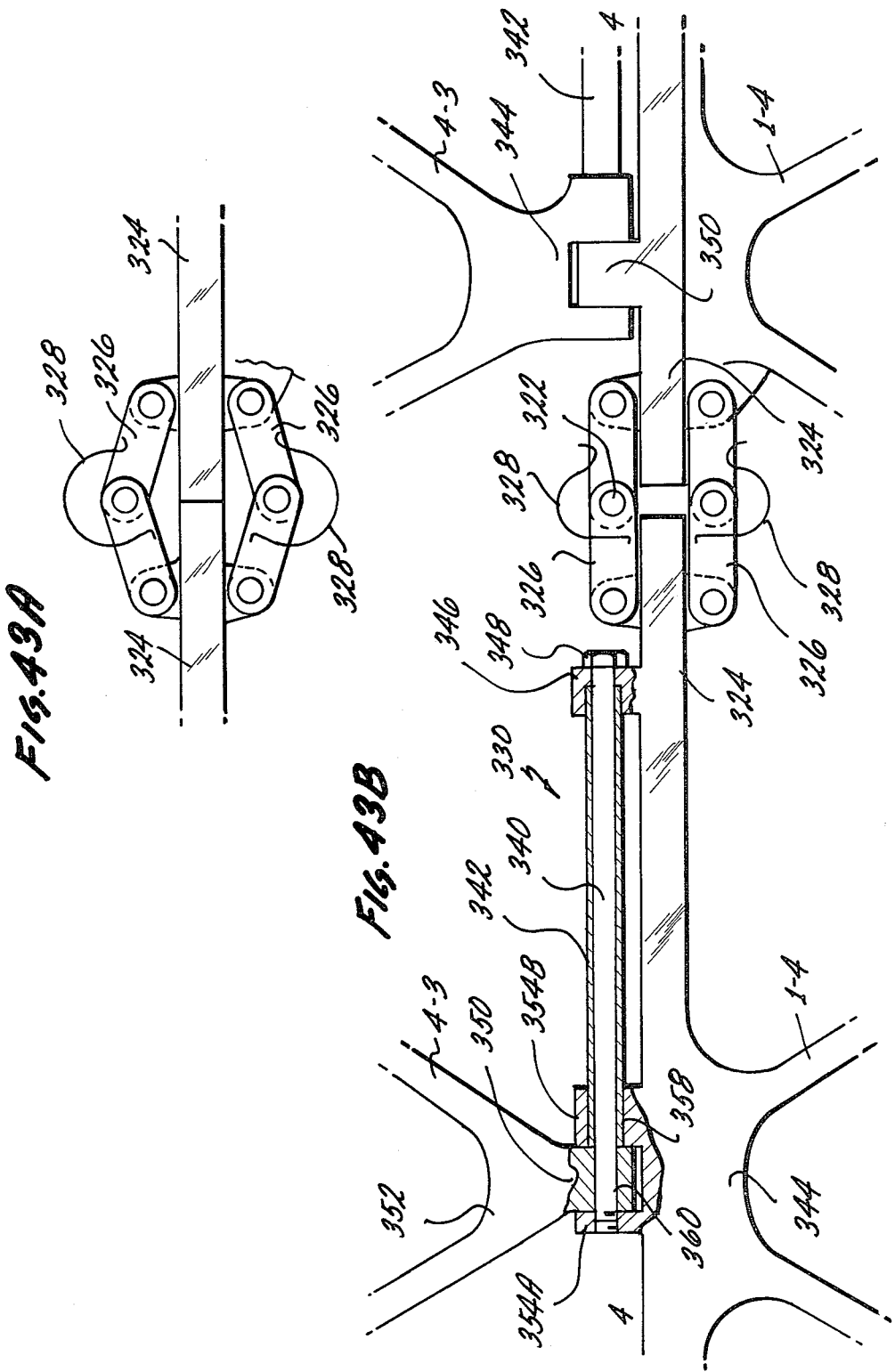

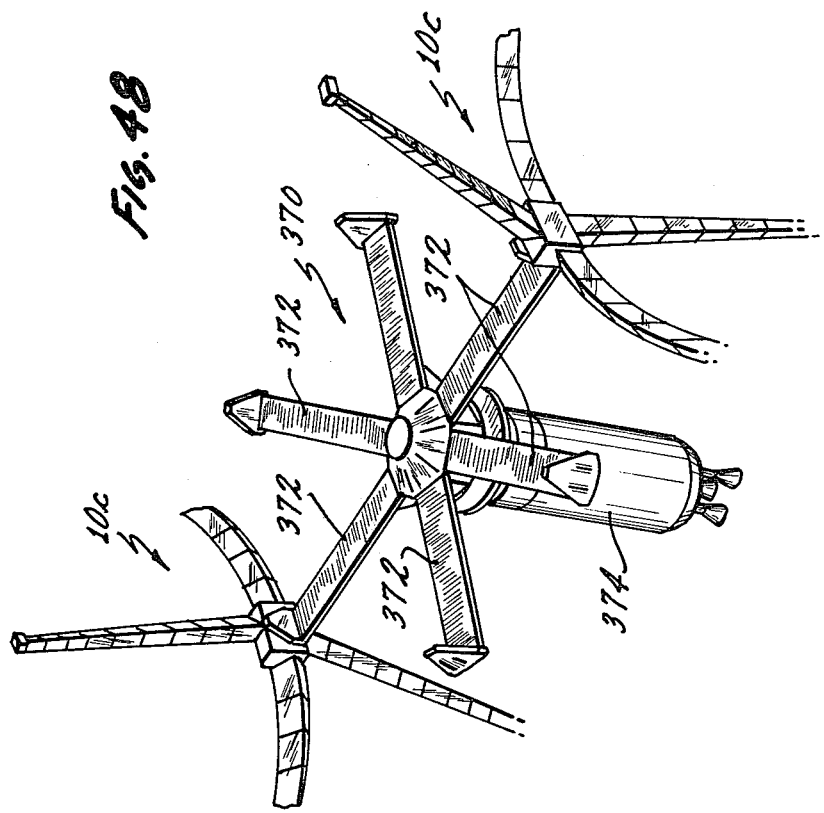
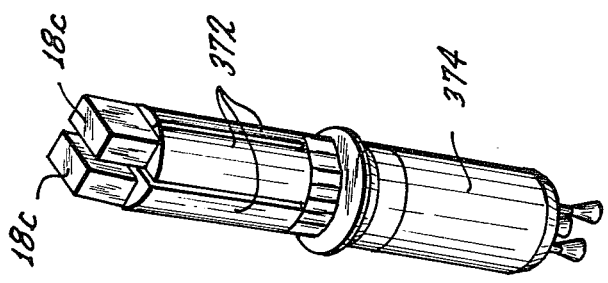

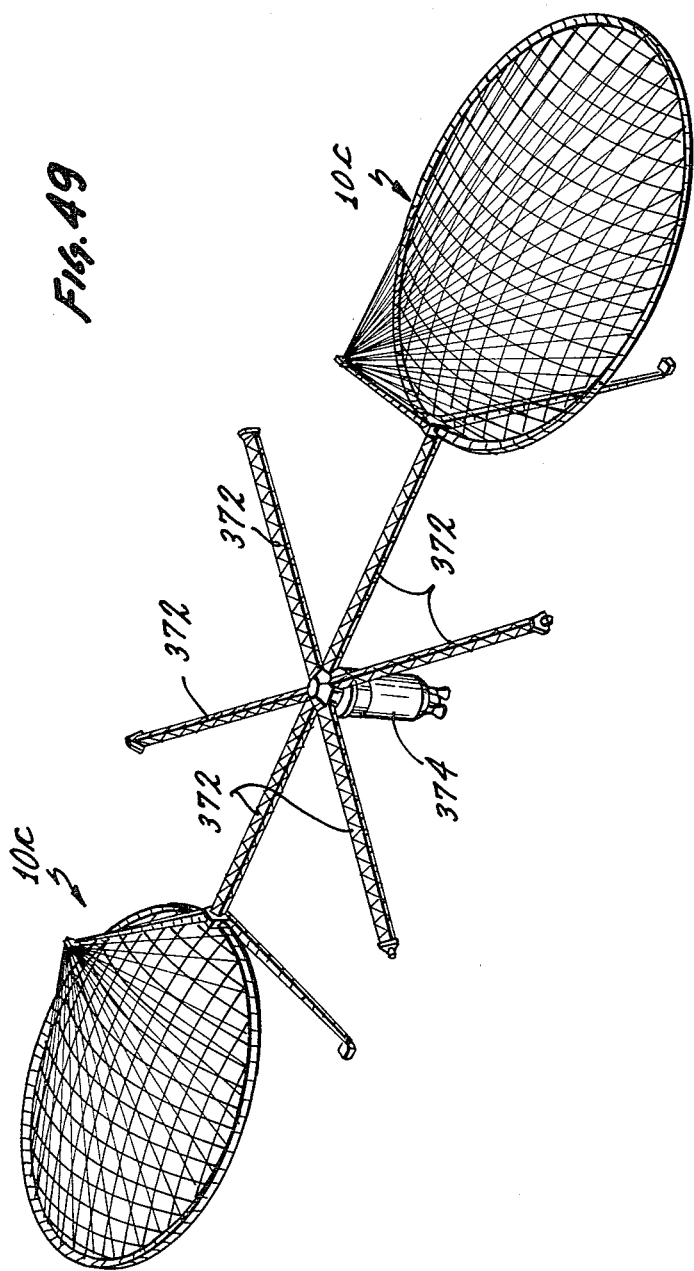

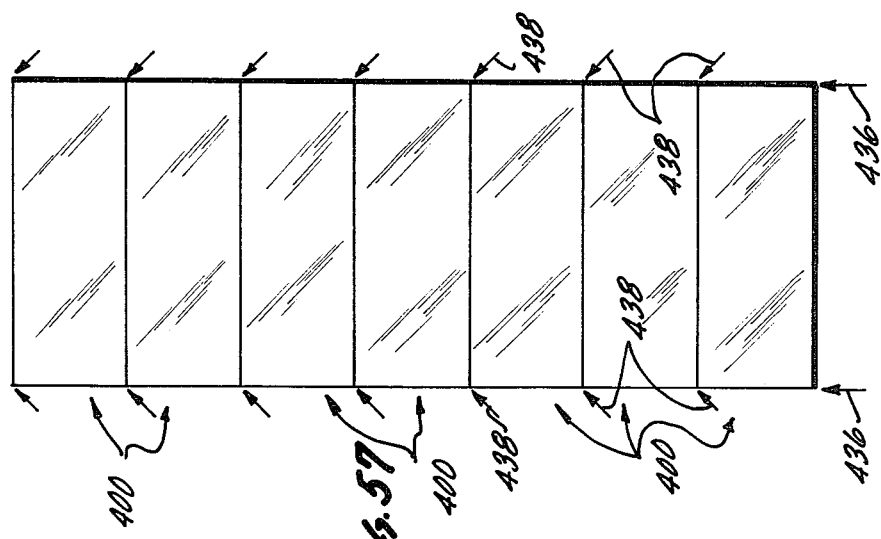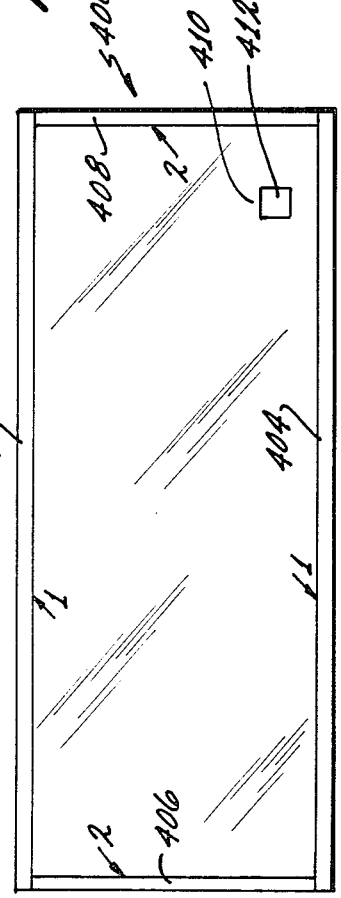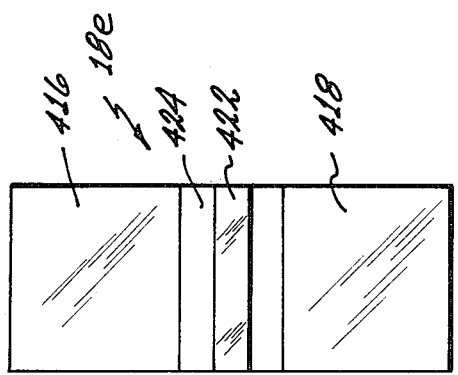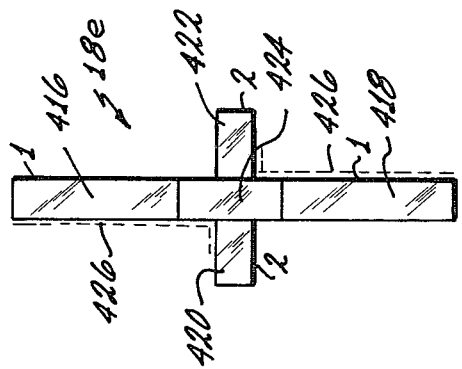

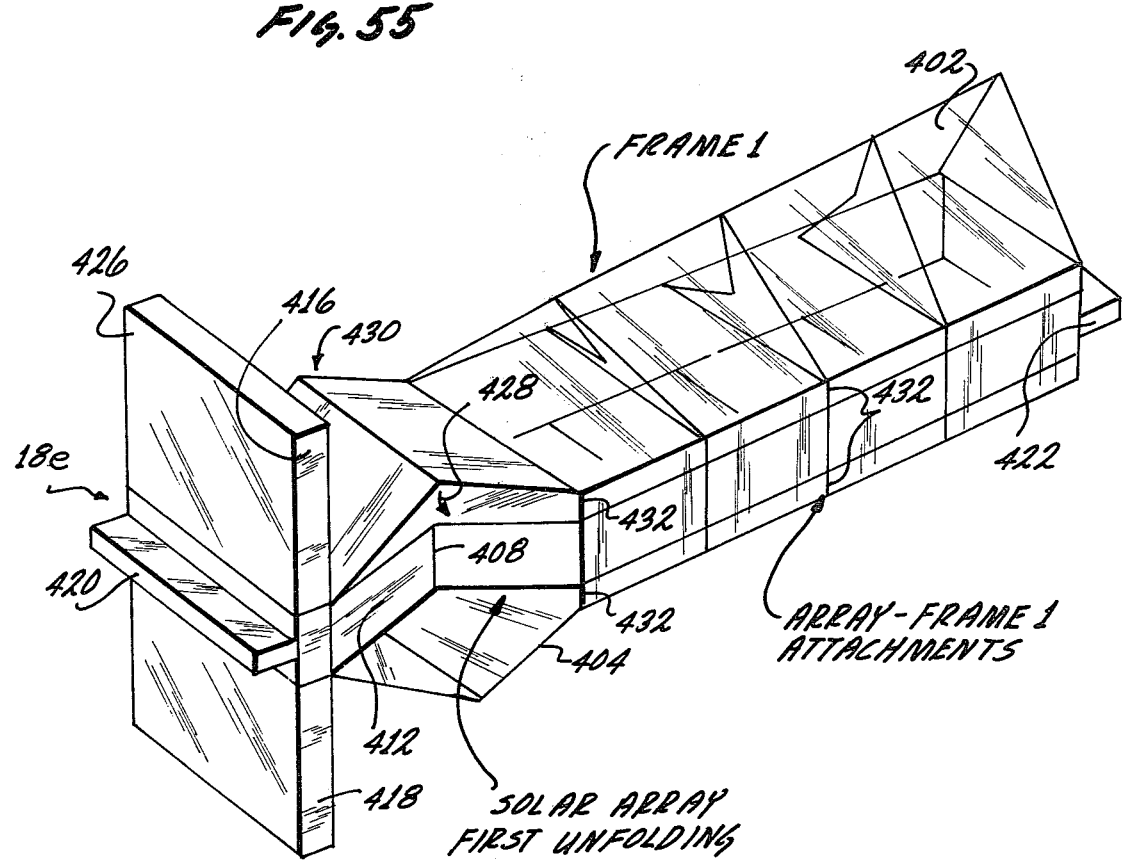

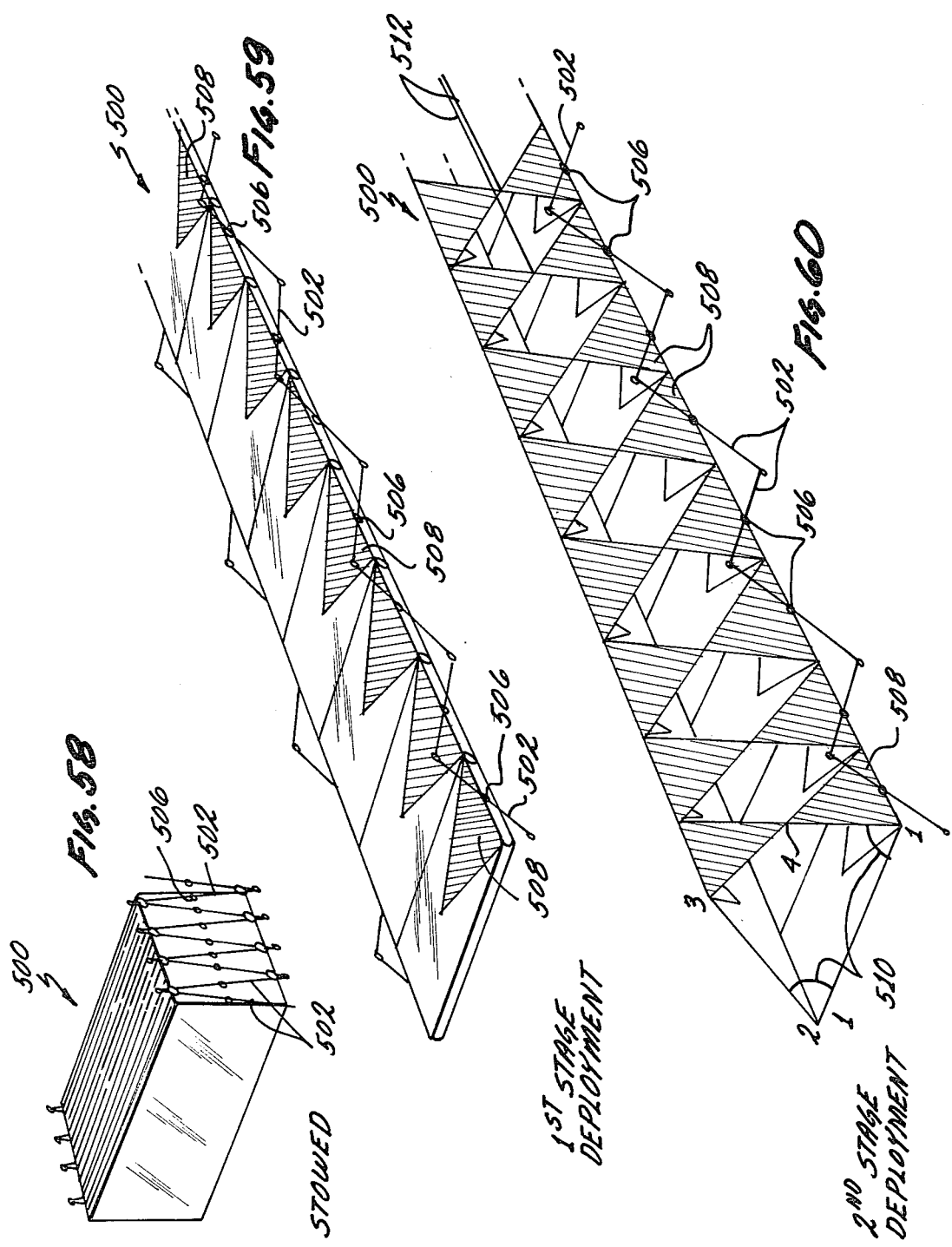

EXPANDABLE PANEL AND TRUSS SYSTEM/ANTENNA/SOLAR PANEL

BACKGROUND OF THE INVENTION

This invention relates generally to depolyable, unfoldable or unfurlable space structures and is directed specifically to expandable panel and truss structures applicable for deploying ring and boom structures to form antennas such as feed-through lens offset (asymmetrical) paraboloidal or feed horn type antennas or for deploying frames for solar arrays.

A wide variety of mechanisms have been utilized to deploy isogrid panels from a storage container into some desired geometric patterned panel or array, such as for radio or radar antennas, solar cell panel arrays, space-craft, solar reflectors, etc. One such deployment system utilizing foldable panel strip for plurality of rectangular panels, hinged edge-to-edge, so that the panels may be folded in accordian-like fashion to provide a flat stack of minimum storage volume, is disclosed in the U.S. Pat. No. 4,151,872 to Slysh et al, dated May 1, 1979. This patent also discusses other patented structures also using panels hinged edge-to-edge with examples of deployment mechanisms.

It is a primary object of this invention to provide an expandable panel and truss structure particularly applicable for deploying structures in orbit and in which the embodiments disclosed form a feed-through lens and paraboloidal antenna structures and solar arrays. It will be seen that expandable panel and truss structures have the advantage of stowed state high packing density as well as deployed state stability and are well suited for use as a stowed assembly in a storage container which can be flown by shuttle for delivery to a synchronous orbit. An example of a shuttle that may be used for transporting the storage container with the stowed assembly is disclosed and claimed in the U.S. Pat. to Lingley et al No. 4,044,974, dated Aug. 30, 1977.

The unique featues of this invention as will be clear from a more detailed description hereinafter, are:

A utilization of a nesting hinge which permits panel structure stowing of ring and boom antenna structures, A utilization of a canister as a center from which the panels are deployed, A close out tether system in two embodiments which is completely automatic for deployment of the antenna structure, A close out system in other embodiments which utilizes a coupling panel set for automatic deployment of the antenna structure, A unique combination of panel structures to form a solar array, A unique combination of expandable truss and expandable panel structures, A means for indexing and radially orientating sprocket racks and lens hangers, A use of sprocket racks for deployment control, A system which deploys efficient boom and ring structures, A deployment system which is positive acting and stable with high stowing efficiency, A deployment of antenna lens and add-ons during the deployment of the antenna structure, A combination of panel structures forming a geostationaryplatform with antenna arrays, and A unique pantograph type deployment system for deploying panel sets.

SUMMARY OF THE INVENTION

The invention comprises an expandable panel and truss structure capable of being stowed in a storage container canister for transportation into space and deployed to form an antenna such as a feed-through lens antenna. The antenna comprises the panels stored as hinge pairs (sets) folded in accordian-like fashion together with the expandable trusses and other devices necessary for antenna space operation such as attitude control and antenna feed. The panel sets are deployed from the storage canister to form a toroidal ring, in one embodiment circular in cross-section, for supporting the antenna lens and to form a feed support boom utilizing the canister as part of the antenna. The canister is connected to the ring and support boom in the deployed state by the expandable trusses. A fully automatic system is included for deploying the antenna including panel set deployment linkages, lens hangers, indexing and orienting sprocket and racks for deploying the panel sets, and a close-out tether system for guiding and holding the antenna structure in its deployed state.

Utilizing the same principle of storing and deploying panel sets from a canister which are circular in cross-section when deployed, a second (back) boom and reflector screen are added to form a paraboloidal antenna.

A second embodiment utilizing the same principle for storing and deploying panel sets from a canister, but with panel sets which are triangular in cross-section when deployed, an offset asymmetrical (paraboloidal) antenna or a feed horn (cornucupia) antenna is formed. This embodiment, like the prior embodiment, utilizes a fully automatic system for deploying the panel sets from the storage container. Two panels sets to form the antenna ring are stored as two packages in the canister, connected by a coupling panel set (in lieu of the close out tether system of the first two embodiments). The two panel sets and the back and feed booms are deployed in the same manner as in the first embodiment.

The deployment of foldable trusses for a geostationary platform in the shuttle for transfer into a orbit is similar to the last stated embodiments.

Also utilizing panel sets of the triangular cross-sectional type, when deployed, are stored and deployed from a canister to form a solar array.

Finally, utilizing panel sets of the triangular cross-sectional type, when deployed, a pantograph type deployment mechanism is used to deploy and retract the panel sets from a canister.

BRIEF DESCRIPTION OF THE DRAWINGS

Other advantages of the present invention, which will subsequently become apparent, reside in the construction and operation hereinafter described, reference be made to the accompanying drawings showing the preferred embodiments of the invention, wherein:

FIG. 1 is a perspective view of a fully deployed feed-through lens antenna comprising the first embodiment including its feed support boom;

FIG. 2 is a perspective view of a storage container for stowing the antenna structure for transportation into space;

FIGS. 3-7 are simplified schematic presentations of the sequential steps of deploying the planar ring of the antenna its expandable trusses and ring tether;

FIG. 8 is a perspective view of the storage container similar to FIG. 2 but partially broken away to show the folded panels within their canisters and part of the means for deploying the panels;

FIGS. 9 and 10 are respective simplified views of the folded panels and the means for deploying the same, enlarged over FIG. 8 to show part of the details thereof;

FIGS. 13 and 14, taken together, show the first of the folded panels emerging from the ring canister with FIG. 14 enlarged over FIG. 13 to show the details thereof;

FIGS. 15 and 16 like the preceding figures show the planar ring of the antenna emerging from the ring canister with the deployment linkage fully deployed; this figure also shows the closeout expandable truss for the ring;

FIG. 17 illustrates the continued deployment of the ring from its canister and the ring tether, the close-out expandable truss and cables;

FIG. 18 illustrates the continued deployment of the ring and a partial view of the feed support boom being deployed from its canister;

FIGS. 19 and 20 are views of a portion of FIG. 18 which together show the details of the means for deploying the ring, the details of the panels, and the means for deploying the feed-through lens;

FIG. 21 shows a portion of the fully deployed ring and feed support boom with expandable external trusses for connecting the ring and the boom to their respective canisters when deployed;

FIGS. 22, 23 and 24 (FIG. 24 being located near FIG. 2) are detailed illustrations of the hinges of the ring panels;

FIG. 25 illustrates an alternative isogrid construction;

FIG. 26 illustrates the invention embodied in a paraboloidal fully deployed antenna;

FIG. 27 illustrates the details of a portion of the paraboloidal antenna;

FIG. 34 is a perspective view of the storage container of the second embodiment of the invention, partially in phantom, to show the storage compartment for the panels and other elements of the antenna structure for transportation into orbit;

FIG. 35 is a top or plan cross-sectional view of the storage container of FIG. 34;

FIG. 36 is an elevational or frontal view of the storage container;

FIGS. 39 and 40 illustrate the deployment of the panels forming the rim, back and feed boom, and the reflector screen from the canister;

FIG. 41 shows the triangular truss construction of the panel sets;

FIGS. 42A-D show the individual panels of the panel sets and the way they are folded and deployed;

FIGS. 43A-B show the detailed parts of the panel sets of FIGS. 41 and 42A-D and the manner for locking the sets in the deployed state;

FIG. 47 shows stowed antennas and a geostationary platform for transportation by a typical space vehicle, partially deployed in FIG. 48 and fully deployed in FIG. 49;

FIG. 52 is a plan view of a solar array comprising four truss panel assemblies;

FIGS. 53 and 54 are, respectively, side and frontal views in elevation of a canister for the solar panel of FIG. 52;

FIG. 55 illustrates the deployment of the top and lower truss panels and solar panels from the canister of FIGS. 53 and 54;

FIG. 57 shows a plurality of solar panels making up a solar array;

FIG. 58 illustrates a stowed array of panel sets with an alternate method of deploying the panel sets;

FIG. 59 illustrates the panel sets of FIG. 58 in the first stage of the deployment; and FIG. 60 illustrates the fully deployed panel sets of FIGS. 58 and 59.

DETAILED DESCRIPTION OF THE INVENTION

Figure 11:
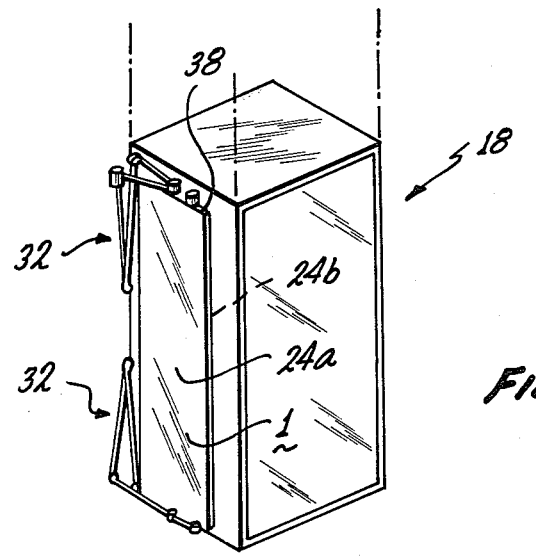
FIG. 11 is a view similar to FIG. 2 of the storage container showing the first of the folded ring panels emerging from the ring canister.

First Embodiment—Feed-through lens antenna with panel sets circular in cross-section when deployed.

First, an overview of the first disclosed embodiment of the invention in the form of the feed-through lens antenna will be described in connection with FIGS. 1 and 2 with brief references to other figures since some detail is necessary to understand the general arrangement of this antenna structure. Note here, however, that the sequential steps of deploying the various elements of the antenna structure are shown in simplified form in FIGS. 3-7.

Referring now specifically to FIG. 1, there is illustrated therein, a fully deployed antenna 10 having a feed-through lens 12 supported by a planar ring 14 and a feed support boom 16 connected to a storage container (canister) 18. The feed support boom 16 is deployed at an angle to the ring so that its signal feed device 20 located at its outer extremity is located centrally of the feed-through lens. Suitable attitude control means 22 is also located at the outer extremity of the feed support boom and the ring 14 is also provided with a plurality of attitude control means 22 including one on the bottom of the storage container 18.

FIG. 2 shows the storage container used for transporting the antenna assembly into space with the various structural elements i.e, panels 24 and lens 12 (FIGS. 1 and 8) folded within in an accordian-like fashion together with the feed and attitude control means 20 and 22.

Storage container 18 is divided into a number of canisters, three of which can be seen in FIG. 2, for storing elements of the antenna. Canister 26 holds the folded feed-through lens 12; canister 28, the folded panels of the ring; and canister 30, the folded panels of the feed support beam 16.

Also shown in FIG. 2 are the ring and boom deployment linkages 32 and 34 for deploying the folded panels 24.

The panels 24 for forming the ring and boom structures are cylindrically flanged open isogrid panels, FIGS. 18-20. The 180° cylinder halves 24a and 24b, for example, are joined along longitudinal hinges 38 as successive panel sets are then joined to each other by circumferential flexible hinges 42. The panels are stress free in the deployed state but when stowed in flat condition, are stressed below allowable material yield stresses. Isogrid is used for the panel construction because of the in-plane shear stiffness it provides without use of continuous skins, as in a honeycomb structure, its excellent weight stiffness characteristics and (due to the open grid work) it experiences small thermal gradients.

As an alternative, the flat patterns of the panels can take the form of a trapezoid in the stowed condition. In this way, the sections between circumferential hinges can be cylindrical when the ring is deployed rather than torroidal as indicated in FIG. 18. In this case, the longitudinal hinges would not be flexed between stowed and deployed states and the panels would experience only flexural stresses to be stowed.

If the torroidal shape is selected, as shown in FIGS. 1 and 18, the ring and boom panels experience in-plane elastic sheared deformation in addition to flexural deformation to be stowed. The panel cross sections and curvatures cause acceptable stowing streses for either aluminum or graphite epoxy construction materials. Stresses created by forcing the panels into a stowed state are minimized by first inducing an oval shape in the boom or ring cross section before forcing hinge rotation. When the hinges rotate (by approximately changing from a curved to a straight hinge) a flexural stress reversal occurs in the panel. Peak stresses are minimized in this way compared to first inducing a cuneated form in the boom or ring cross section by breaking the hinges.

FIGS. 3-7 show the sequential steps of forming the ring and lens of the antenna with FIG. 3 showing the initial deployment of the ring and lens from their respective canisters and ending in FIG. 7 where the fully deployed ring and lens is shown connected to the storage container 18 by expandable trusses 44 and 46.

Truss 44 is called the close-out expandable truss even though it emerges first from the storage container and is stored in the ring canister 28. Its purpose is to connect the ring to the canister while truss 46 is called the forward expandable truss and is stored in the ring canister 28 and connects the ring to the canister. This figure also shows a tethering cable 48 which serves to aid in forming and closing the ring against the close out truss 44. Not shown in this figure is the deployment of the feed support boom 16 and its expandable trusses by the deployment thereof is similar to the deployment of the ring and as will be clarified in more detailed description hereinafter.

FIG. 8, previously referred to, illustrates the manner in which the panels 24 are held in folded condition within their respective canisters. FIG. 9 is an enlargement of a portion of the ring structure and deployment means 50 within the ring canister 28 and FIG. 10 is an enlargement of a portion of the feed support boom and deployment means 50 in the boom canister 30.

More specifically with reference to the ring canister 28 of FIGS. 8 and 9, the panels are folded or stacked in accordian-like fashion in folded pairs and retained wtihin the canister by dogs 52 mounted on horizontal lead screw shafts 54 (4 shown) extending through keyways 58 in the panels and alternately oriented 90° in each successive panel set. The lead screw shafts 54 (forming part of the deployment means 50) are mounted on gear boxes 62, one shown in FIG. 9, operable by a vertical drive jack shaft 64 (also shown in FIG. 9). In addition, in these figures are portions of a canister support wall 66, and stack advance plate 68. The forward expandable truss 46 is located on one side of the support wall 66 with the close-out expandable truss 44 located on the opposite side of the support wall 66 and held in by dogs 70 at the end of the lead screw shafts 58. Again, one such lead screw shaft and dog is shown in FIG. 9. The drive jack shaft 64 is driven by a stepping motor 72 (FIG. 8).

In FIGS. 8 and 10, there is also shown lead screws shafts 52 extending through the folded stacked boom support panel pairs 24, dogs 52 located on the ends of the lead screw shafts, a gear box 62 operated by a vertical drive shaft 64 which in turn is driven by a stepping motor (not shown). These are located on one side of the canister support wall 66 and like the ring canister there is also provided a stack advance plate 68. (The boom deployment devices 50 in FIGS. 8 and 10 that have the same function in the ring deployment devices were given the same reference number for simplicity). The panels and its close out expandable truss 46 are folded in a manner similar to the folding of the ring panels, etc, in the ring canister except in this case the feed and attitude control support expandable truss 74 is located on the outside of the panels. The reason for this is that the expandable close out trusses 46 for the ring and boom in their final deployed condition are adjacent the canister while the forward expandable truss 74 for the feed and attitude control of the feed support boom is located at the end of the boom. This is shown in FIG. 1.

In FIGS. 8, 9 and 10, the expandable trusses are shown only schematically but these trusses are of the carpenter-hinge strut folding type and may include telescoping members to maximize stowing and deployment efficiency.

FIG. 8 also shows the clearance 76 in the bottom wall of the storage container for the clearance of mounting brackets 78 (FIG. 24) for the attitude and control packages 22 which will ultimately be located circumferentially of the ring in the deployed condition as shown in FIG. 1.

Ring structure deployment is initiated on the release of the panels in hinged folded pairs from the ring canister.

Again, referring to FIG. 8, the ring panels are formed with the 180° cylinder halves 24 and 24b joined along longitudinal hinges as successive panel sets and are then joined to each other by circumferential flexible hinges 42 for stowing in the ring canister. They are forced into a stressed state by first inducing an oval shape in the ring cross section before forcing hinge rotation. (The hinges and their relationship to the stowed and deployed panels will be described later). Being in a stress condition, upon turning of the lead screw shafts 54 incrementally by the stepping motor, the feed dogs 52 release the panel as panel sets one at a time by allowing the dogs 52 to pass through the locking slots 58. Keyways 58 are oriented (clocked) an additional 90° in each successive panel sets to permit this incremental release. When the keyways and dogs are aligned, panel sets containing these keyways are released. However, the succeeding panel sets which have clocked keyways at 90°, are restrained.

To insure uniform dog release action, the structural panel sets are advanced toward the canister opening as the panels or trusses are released and deployed by the stack advance plates 68, already mentioned in FIGS. 9 and 10, mounted on and driven by the lead screw shafts for this purpose. Unidirectional rotation of the lead screws cause the stack advance plates to move forward. It is to be noted that the canister section holding the ring close-out expandable truss 44 has no stack advance plate as the truss is released by a single rotation of its retaining dog 70 and relies on its stressed stowed state to deploy once released.

The stack advance plates 68 are a little larger than the panels and therefore when the panels and expandable trusses are fully deployed, the advance plates are able to seat on the rims 80 (FIG. 8) around the openings of the canisters through which the panels were deployed. Action of the lead screws maintains a structurally stable engagement between the stack advance plates 68 and the rims 80.

It is also to be pointed out that while stepping motors are mentioned for actuating the mechanisms, rotary solenoids or other incremental drive subsystems may be used. A synchronized common drive may be also used to rotate the ring retaining dogs at the same time the boom retaining dogs are rotated. In this case, however, the boom is fully deployed before the ring (because the ring has more panels than the boom), the boom retaining dogs 52 continue to rotate after completion of boom deployment and the boom lead screws 54 would run out of engagement with the boom stack advance plate 68.

Before describing the operation of the deployment linkages 32 and 34 for the ring and boom, a further overall view of the manner in which the ring is formed is worthwhile.

FIGS. 11,13 and 15, show the first three panels deployed from the ring canister, the close out expandable truss 44 and a portion of the tether 48. FIG. 17 shows further panels having been deployed with the tether 48 connected to the first panel set (heretofore omitted from the drawings for simplicity of the disclosure). FIG. 18 shows the partially deployed ring panels a portion of the lens and FIG. 21 shows a partially deployed boom 12 and a portion of the fully deployed ring and lens. The remaining figures 19,20 and 22-24 show the details of the manner in which the hinges are formed and operate in the stowing and deployment operation.

Figure 12:
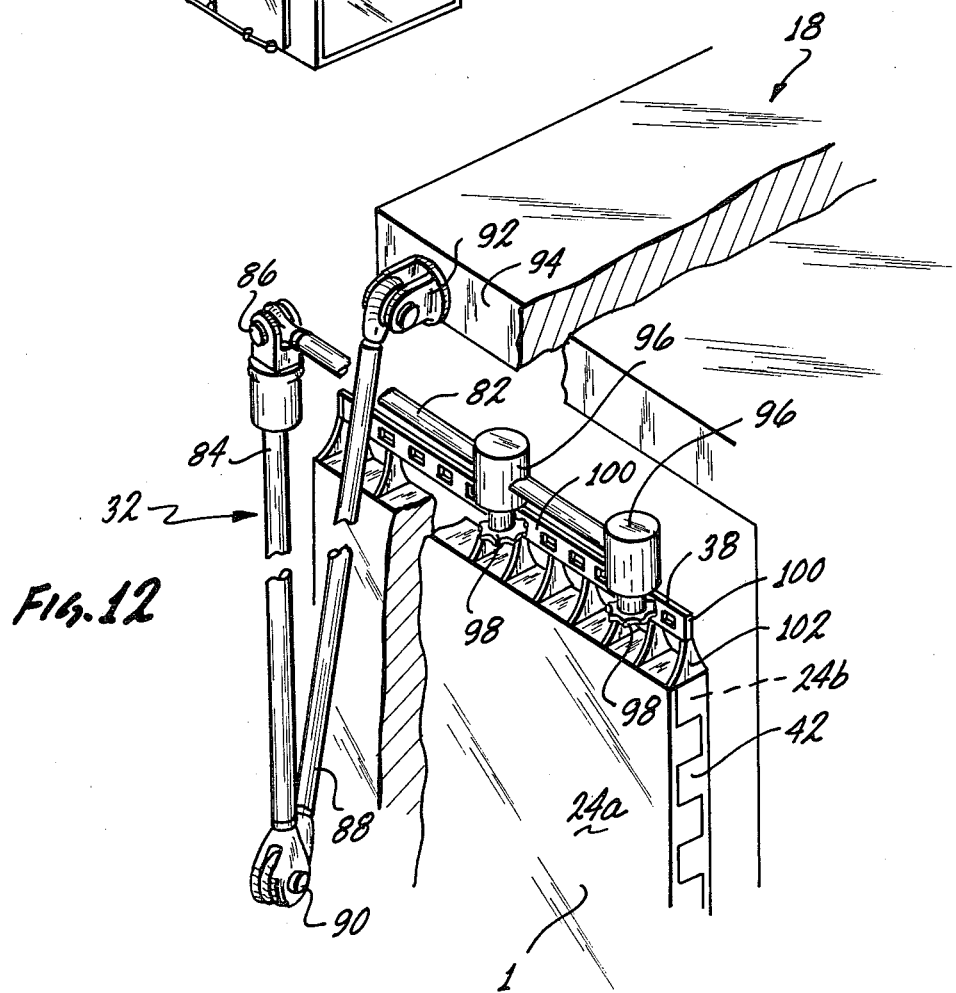
FIG. 12 is an enlarged view of a portion of FIG. 11 to show the details of the deployment linkage.
Figure 28:
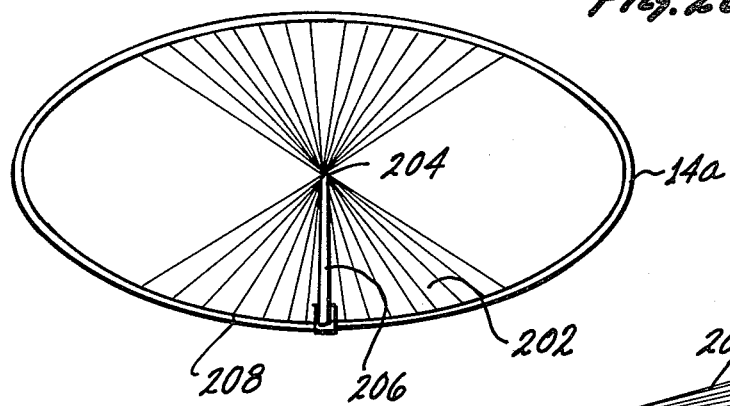
FIGS. 28 and 29 are back and side views; respectively, of the paraboloidal antenna illustrating a second boom and means for maintaining the ring in its paraboloidal configuration.
Figure 29:
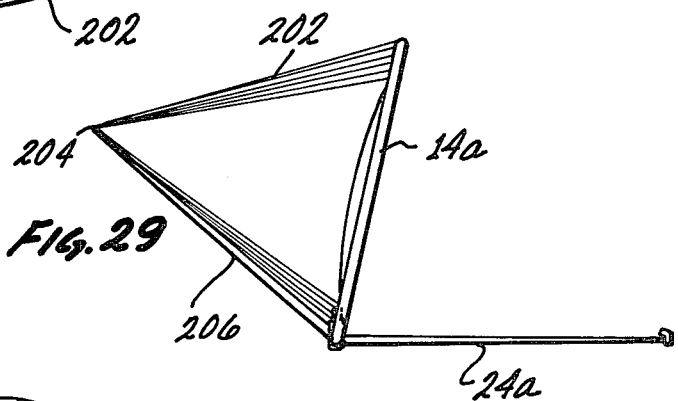

Turning now back to FIGS. 11 and 12 which illustrates the initiation of the deployment of the ring panels with one of the ring deployment linkages 32. The continued operation of the deployment linkage is illustrated in FIGS. 13-16. Only one linkage will be discussed for the purpose of illustrating the operation of both top and bottom linkages 32 (both being shown in FIG. 2).

The disclosed deployment linkage 32 in these figures comprises a first link 82 fixedly attached to the longitudinal hinge 38 of panel set No. 1 and pivotedly connected at its other end to one end of a second link 84 through a swivel hinge 86. The other end of link 84 is pivotedly connected to one end of a third link 88 through a second swivel hinge 90. The other end of link 88 is pivotedly connected by a swivel hinge 92 to a top wall 94 of the storage container 18. On the first link 82 are brake and dampeners 96 for braking and dampening the rotation of sprockets 98 which engage hinged sprocket racks 100 mounted on the panels by rack supports 102. These sprocket racks are wired to the axes of the longitudinal hinges and gaps, between the sprocket racks 100, are controlled to insure uniform rack toothhole pitch across the gaps. This, in effect, provides continuous tape sprocket racks along the entire lengths of the ring (and boom).

FIGS. 11 and 12 illustrate, as stated before, the emergence of one panel set No. 1 (panels 24a and 24b) as one panel pair while FIGS. 13 and 14, taken together, illustrate the first panel set No. 1 about to form a toroid and illustrate the movement of the linkage outwardly of the storage container with the second panel set No. 2 emerging. The deployment of the panel set No. 1. causes link 82 to rotate 90° about link 84 FIG. 14 also shows, for the first time, sprocket rack guides 104 for guiding the sprockets 98 and sprocket racks 100 as the panel sets are deployed.

FIGS. 15 and 16 illustrate full deployment of the linkage 32 and deployment of three panel sets Numbers 1,2 and 3 with a fourth panel set No. 4 about to emerge from the ring canister 28. The deployment of panel sets Nos. 1, 2 and 3 result in the linkage rotating to a locked-in alignment position.

The ring deployment linkages engage and guide the ring along its longitudinal hinges at a ring section that is nearly toroidal or fully deployed. The deployment linkage 32, when fully extended, covers more than three panel lengths thus always extending beyond the structurally unstable released panel pairs to maintain alignment between the ring and its canister. During the deployment of panel sets 1,2 and 3, the brakes 96 are activated to arrest sprocket rotation and provide a fixed attachment between link 82 and longitudinal hinge 38 of panel set No. 1. Brakes can be controlled by hard wire or mechanical means and triggered by the state of rotation of the joint between the links 82 and 84. When panels Nos. 1,2 and 3 and the links are deployed, the brakes are released. The 90° rotation between links 82 and 84 could operate to trigger the brake release by some mechanical or electrical means.

Friction in the joints between the links and the canister mitigates much of the spring energy released by the panel sets Nos. 1,2 and 3 during their simultaneous deployment with the linkage. Deployment of the panel structure after the first three sets procedes by the release of two panel sets at a time with the dampeners absorbing nonuniformly released spring energy stored in the panels and thereby minimize excitation of dynamic loads in the structure and linkage. The brakes and dampeners may be replaced by, or backed up by, servo control stepping motors which would synchronize the movement of the upper and lower sprocket racks 98 and could also verify completion, if desired, of each deployment sequence before engaging an ongoing sequence.

Panel release sequences could also be precisely timed if desired to cause the boom and the ring to grow at constant rate; the avoidance of a start and stop motion between the structures and canisters would minimize a deployment shaking forces. When the last ring panel sets are deployed, the close-out expandable truss 44, previously released, rigidly associates the ring and canister as discussed in connection with FIG. 17.

FIG. 17 shows tether 48 during deployment. Four light weight tethers (lines) 110 payed out by a programmed release and take-up assembly including reel 112. The assembly is located at the center of the close-out expandable truss 44 and located in canister support wall 68 (not shown in this Figure). The tethers 110 eminating from it pass around a rim 114 of the expanded close-out truss. The tethers are individually attached to heavy close-out cables 116 (four shown) which in turn are attached to four equally spaced points on the periphery of the first deployed ring panel set No. 1. As the ring approaches its end, it is automatically guided, seated and positively engaged by the close-out expandable truss 44. The heavy close-out cables have adequate pull strength for this function. The light-weight tethers are chosen to react small friction and transient deployment loads. While not shown in FIG. 2 or in FIG. 17, it becomes apparent that parts of the tether and close-out cables are stowed external to the storage container 18. Cable routing as well as programmed pay out and reel in rates are synchronized with the ring and lens deployment by a suitable programing means.

The reel and release and take-up assembly are mounted on the support wall 46 in a plane unused for stowage and deployment of this truss.

The linkages 32 and 34 when fully deployed remain to stabilize the fully deployed ring and boom and the forward and expandable trusses being truncated trapezoid-like in configuration and being attached to the canister and ring and boom together with the linkage provide a stable rigid connection between the canister and the ring and boom.

While deployment of the boom can be programmed to occur before, during or after ring deployment. FIG. 18 shows ring deployment and boom deployment occurring simultaneously. This figure, together with FIGS. 19 and 20, also show the deployment of the lens 12 from the lens canister 26. This deployment of the ring also unfurls the feed-through lens membrane. The lens side of the ring panel longitudinal joint 38 includes a series of hinge lens hangers 120 spaced along the hinged sprocket racks 102 both of which are spliced between the longitudinal hinge clevises 122. The hinge axle 124 for both the lens hangers 120 and the hinged sprocket racks 102 is the same as that of the longitudinal hinge 38 with supports for the hangers and sprocket racks spliced between the hinge clevises. As the panel pairs move from stowed to deployed states, balance frictional forces acting on the supports tend to prevent their rotation. In this way, the hangers and rack tend to maintain a constant radial orientation. Two balancing wire springs (not shown) per support, reacting equally against the hinged panels, might be also used to overcome variable friction and structural characteristics such as material and cross-sectional properties to insure radial orientation. Lens membrane tension in the feed-through lens is provided by coiled springs 124 between the hangers and lens. These spring are shown only as lines in FIG. 18. The spring rate selected for these springs must be consistent with ring deployment force levels and distortion caused by thermal gradients, creep, and manufacturing tolerances.

Turning now to FIG. 24 which shows the previously mentioned mounting bracket 78 for mounting the attitude control means which was in the canister and moved out of the clearance 76 (FIG. 8) on ring deployment. This mounting bracket is on the outside longitudinal joint of the ring, and in the embodiment shown, there are two such mounting brackets for each attitude control located on the ring (but not for attitude control on the bottom of the canister) as shown in FIG. 1. Only one is shown in FIG. 24 to explain its function and operation. In the embodiment shown, the bracket 78 is integral with panel 24b and therefore changes its orientation with respect to panel 24a when the panels experience relative motion in moving from a stowed to a deployed condition. In the stowed condition, the bracket is in contact with a hinged sprocket rack 102 but in the deployed condition a space develops between the bracket and the rack. This is the state in which the sprocket 98 of the linkage mechanism 32 engaging the sprocket rack passes through this space. The attitude control package mounted on the bracket 78 must also clear the deployment mechanism.

Referring back to FIGS. 3-7, the sequence where the ring and the attached lens are deployed is depicted. The lens will have a radial seam 126, FIG. 7, between the aperture center 128 and canister. The primary leg of lens power delivery harness (not shown) may run along this seam. The harness then can spread radially from the aperture center 128 or circumferentially from spaced junctions along the seam.

As mentioned before, FIG. 21 shows a portion of the deployed lens 12, ring and boom with the forward and close-out expandable trusses 44,46 of the ring and the forward expandable truss 130 of the boom. This Figure also shows that, after full deployment of the two structures, two external expandable truss links (one shown at 132) are released to connect the ring and boom together. These links are stowed on the outside of the storage container.

Turning now to FIGS. 22 and 23 particularly, it is important that there is an understanding of the nesting of the hinged pairs for the panels and how the hinges separate when the panels are deployed. As previously explained, simultaneously deployed circumferentially hinged panel pairs have coaxial hinge axes 42 (see FIGS. 11 et seq). (The nesting of the circumferential hinges having coaxial axes is illustrated in FIGS. 22 and 23). For the sake of clarity, a pair of hinged panels are illustrated as panels Nos. 1,2,3 and 4 in FIGS. 21,22 and 23 with the separated hinges. Hinge panels 1 and 2 are on the outside of hinge panels 3 and 4 with the hinge clevises 134 of the panel sets, mutually nesting in alternating spaces 136 between clevises to allow the hinge axes to be coaxial. Axels or pins 138 join the clevises and to minimize stowed state stress peaking in the hinges, the clevises is made as narrow and as widely spaced as strength and stiffness requirements allow. Typically, clevis widths of 0.1 inch and spaces between the clevis of 2 inches are adequate. The clevises may be restricted to isogrid nodes along the panel edges. Structural continuity (load transfer) between panels is then at the nodes. These figures also show how the nested circumferential hinges separate when the panels are deployed as indicated by arrows 140 and since there are no hangups in the nested hinges, they go together or go apart equally well whether the panels are in a stowed or deployed orientation. Transforming from the stowed to deployed state, the axes of the circumferential hinges are changed from a straight to a curved line. When the axes are curved, the hinges are locked out and structural continuity exists across the hinges in the plane of the shell, that is, the structure acts as if the circumferential hinges are not present.

Finally, the stacking efficiency of the flanged type isogrid, shown in FIGS. 19 and 20, can be significantly improved by the hat section (node 142) construction depicted in FIG. 25. A node depth of a 0.5 inch and a 0.04 inch gage material, as an example, provides flexural stiffness properties comparable to the flanged isogrid discussed in the foregoing figures while reducing the stacking height by a factor of 5. In selecting this configuration, it is essential that the hat sections in a stack have unidirectional orientations so that when the sections are deployed, the hat sections will have alternate inside-outside orientations from panel to panel in both longitudinal and circumferential directions.

From the foregoing it can be seen by those skilled in the art, that the expandable panel and truss system can have the following alternatives and still come within the scope of the invention: the ring structure can be replaced by lateral structure such as a hexogon or octogon, the single canister center system could be replaced by multiple canister center systems which could deploy a truss frame structure consisting of boom trusses and canister center-truss junctions, multiple structures also may be ganged together through mounting brackets such as disclosed at 78, FIG. 24, the disclosed antenna is programmed to automatically deploy, and a teleoperator and EVA involvement in a deployment process is possible. (This could include monotoring and controlling the deployment sequences and correcting possible malfunctions), and three or four separate release and take up reel assemblies can be attached to the ring of the close-out expandable truss 44; (the reel drives could lock out the attachment between the deployed ring and the close-out truss with relatively short close-out cables and without compressively loading the close-out truss).

Finally, to illustrate how the overall size of the storage container permits it to be transported into space, a feed-through lens 900 ft in diameter having rings and booms of 20 ft in diameter and a boom length of 1100 ft, can be stowed in a storage container 46 ft by 14 ft by 10.5 ft.

Also, it should be pointed out that as a technical approach, the feed-through lens of this system provides r.f. gain and limited beam steering. The main lobe or lobes, if operated in an amplitude monopulse mode, are radiated from the aperture side opposite the feed. Consequently, aperture blocking by the feed support boom has small effect on the far field radiation pattern. Built-in power distribution harnesses, previously mentioned, and frequency sensitive lumped constant microwave circuits include the operative lens elements providing gain and the beam steering. The character of the radiation from the primary feed controls the beam steering. The effects of aperture positioning errors on gain, beam width and side and back lobes are small compared to those in center fed paraboloidal or fixed array antennas. This is due to the piece-wise continuous r.f. phase shifting across the aperture. If the primary feed main beam pattern is viewed as a collection of many small radiation pencils, the lens can be understood to have the capability to collectively control amplification and phase shift in the pencils as they are transmitted through the lenses.

The phase shifting produces a nearly uniform radiated phase front required for main beam collimation. Therefore, precise positioning of the lens is not critical. Monotonic lens surface deviation of a few wave lengths may be permitted before significant degradation and radiation performance occurs. If radiation in L-band and lower frequencies is used, the allowable aperture tolerances will permit aluminum for the antenna construction material. Greater dimensional stability therefore higher operational frequency and lower overall structural weight would result from use of graphite epoxy as the construction material as suggested previously.

As stated above, the expandable panel and truss system permits deployment of a large precision antenna out of a very compactly stowed package.

This concept is extended to deploy a precision paraboloidal antenna out of a space shutter cargo bay. Such an antenna is shown in FIGS. 26–31.

Assuming a paraboloid 1000 ft by 5000 ft, the stowed condition package size for this antenna is about the same as that discussed above.

Second Embodiment—An asymmetrical paraboloidal antenna with panel sets circular in cross-section when deployed.

Taking first the antenna identified as 10a in FIGS. 26–29, it will be seen in the following description, that those structures having substantially the same function or the same general features as those of the preceding figures will be given the same reference numeral but with a suffix a.

Thus, there is shown in these figures a planar deployed ring 14a connected to a canister 18a from which the ring was deployed with a deployed feed support boom 24a and feed and attitude controls 20a, 22a at one end thereof. In this case, however, the ring is called a reflector ring and is in the form of an asymmetrical paraboloid of revolution with a focal-length-to-diameter ratio of 0.6. Any focal-length-to-diameter ratio can be used and any reflector can be, alternatively, circular, square, rectangular or any usable reflector shape. The reflector surface 12a is of a wire spring mesh 200 supported on the reflector ring and shaped by a plurality of back wires 202 gathered and attached to one end 204 of a back boom 206. The other end 208 of the wires are attached to the reflector ring. The back boom 206 is deployed in the same manner as the feed support boom 24 is deployed in the previous embodiment but in the opposite direction from the canister. The connection of the wires 202 to the reflector ring span only a portion of the ring to provide the parabolic configuration of the ring. These wires can be 0.002 inch diameter graphite epoxy filaments attached to the screen in one to four foot intervals.

As shown in FIG. 27, not only is the feed support boom 24a attached to the canister 18a by an expandable truss 130a and to each other by external trusses 132a as previously explained, but the back boom 206 is also attached to the canister 18a by a similar expandable truss arrangement including the external trusses all indicated by the reference 210. In this embodiment, however, the reflector surface 12a is attached to the side 212 of the reflector ring closest to the feed rather than along an inner hinge as in the case of the previous embodiment. This attachment is limited two points on the circumferential hinges and requires the screen edge or an extension of it as by wires 214 be sandwiched between folded ring panels when in a stowed state. Reflector ring 14a deployment sequences is similar to that described in connection with the ring 14 of the previous embodiment, but in this case deployment of the back boom must be coordinated with the deployment of the ring since the reflector screen and back wires are packed like a parachute so their release requires proper pull out sequencing.

This embodiment differs also from the previous embodiment in that the feed and back booms 24a and 206 are tapered shell structures. However, the nesting hinges are the same for holding and stowing panels and are basically unaffected by the tapering of these structures so that their operation remains the same as in the previous embodiment. However, boom thickness must be proportional to boom diameter to maintain constant stow state stresses. It will also be possible and is within the scope of this invention to uniformly taper the ring structure diameter as a function of the distance from the canister center. The effect of tapering the ring and boom structure would be to maximize antenna resonent frequencies with respect to a fixed canister center. If these frequencies are high enough for attitude control system stability, inertia-reaction actuators may be limited to the canister center region and the possible slewing rates they can produce would be maximized.

Figure 30:
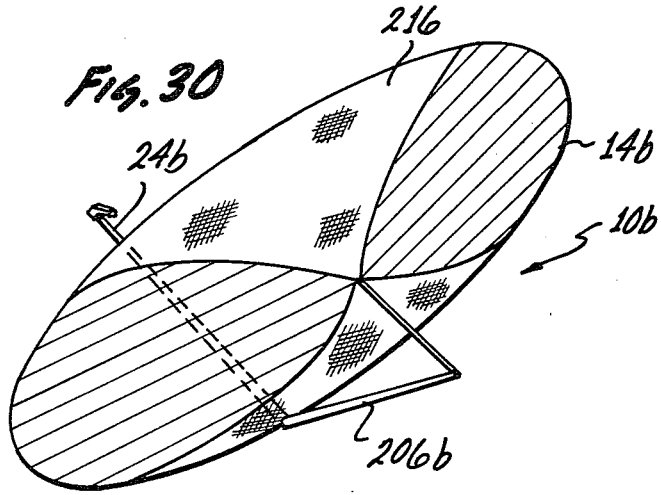
FIGS. 30 and 31 are back and side views, respectively, of alternate means for maintaining the antenna ring in its paraboloidal configuration.
Figure 31:
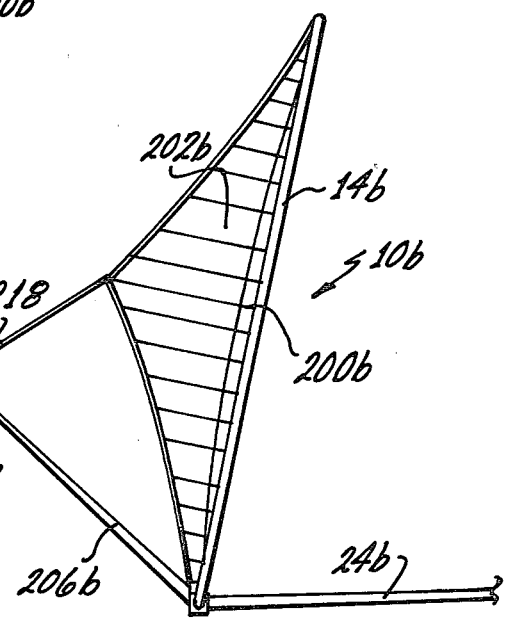

FIGS. 30 and 31 show an alternate reflecting screen system for forming a paraboloidal antenna 10b which uses a course (heavy wire) back screen 216 to control back wires 202b that shape the reflecting screen 200b.

Again in these figures those structural elements having similar functions or features as in the preceding embodiments are given the same reference numeral with the suffix b.

By using the back boom 206b and a tension cable 218, the reflector screen is allowed to be limp (untensioned) during ring deployment. Otherwise this tension, were it present, would constrain ring deployment. Full tension is applied after the ring is deployed by tension cable take up, or by back boom extension.

The back screen 216 minimizes the complexity and weight of the screen shaping systems and if the tension cable is controlled, back boom deployment may be independent of that of the ring. Also, structural stability of the reflector screen shaping system is enhanced by the back screen 216 due to its added ring boom attachment circle as at 218 and consequently attainable reflector accuracy is maximized.

If attitude control actuation is restricted to the canister center, this configuration permits development of a structural system that minimizes monotonic parabolodal dish surface distortion by actuation moments. This may be accomplished by tailoring back wire pretension as a function of the distance from the canister center and by controlling take up in the tension cable as a function of applied moments, that is, cable take up and release would be a controlled system function. A control cable (not shown) between the back and feed booms may also contribute to feed position control. This control cable would extend into the aperture area and would have a low dielectric constant to minimize effects of aperture radiation.

It is also desirable that the pretension in the back wires be high enough to insure low, positive screen tension field in the presence of worse case thermal distortions. These thermal distortions are minimized by the extreme structural openness to solar radiation, as in the case of the previous embodiments. However, thermal expansions and contractions, uniformly and simultaneously induced in all parts of the antenna structure, will have no effect on screen tension or antenna performance and pretension for this effect is unnecessary.

If the screen mesh and back wires are light enough relative to wire spring rates, thermally controlled ground fit checks of the back wire supported reflector service would adequately predict surface contours in zero gravity. If not, the screen can be accurately manufactured in a mold and back wire lengths individually computed. The construction accuracies of a complete ring and boom structures may be roughly checked in cradle fixtures. In-space accuracy may also be the result of piece wise check of subassemblies in a zero-G simulation facility.

Third Embodiment—An asymmetrical paraboloidal antenna formed of panel sets which are triangular in cross-section when deployed.

The third embodiment of the invention will be described in connection with FIGS. 32 and 33 which show the general arrangement of the antenna structure formed of panel sets which are triangular in cross-section when deployed. The sequential steps for steps for deploying the various elements and the elements themselves will be described in later figures.

Also, where practical, the same reference numerals will be used in these figures where the same structures have the same functions as in the prior figures but a suffix c will be added. This simplifies and shortens the description of the invention.

Also to simplify the remainder of the disclosure of this invention, the means for indexing and moving the panel sets of these latter embodiments for the canister such as deployment means 50 of the prior embodiments will not be shown or described in connection with these latter embodiments.

Figure 32:
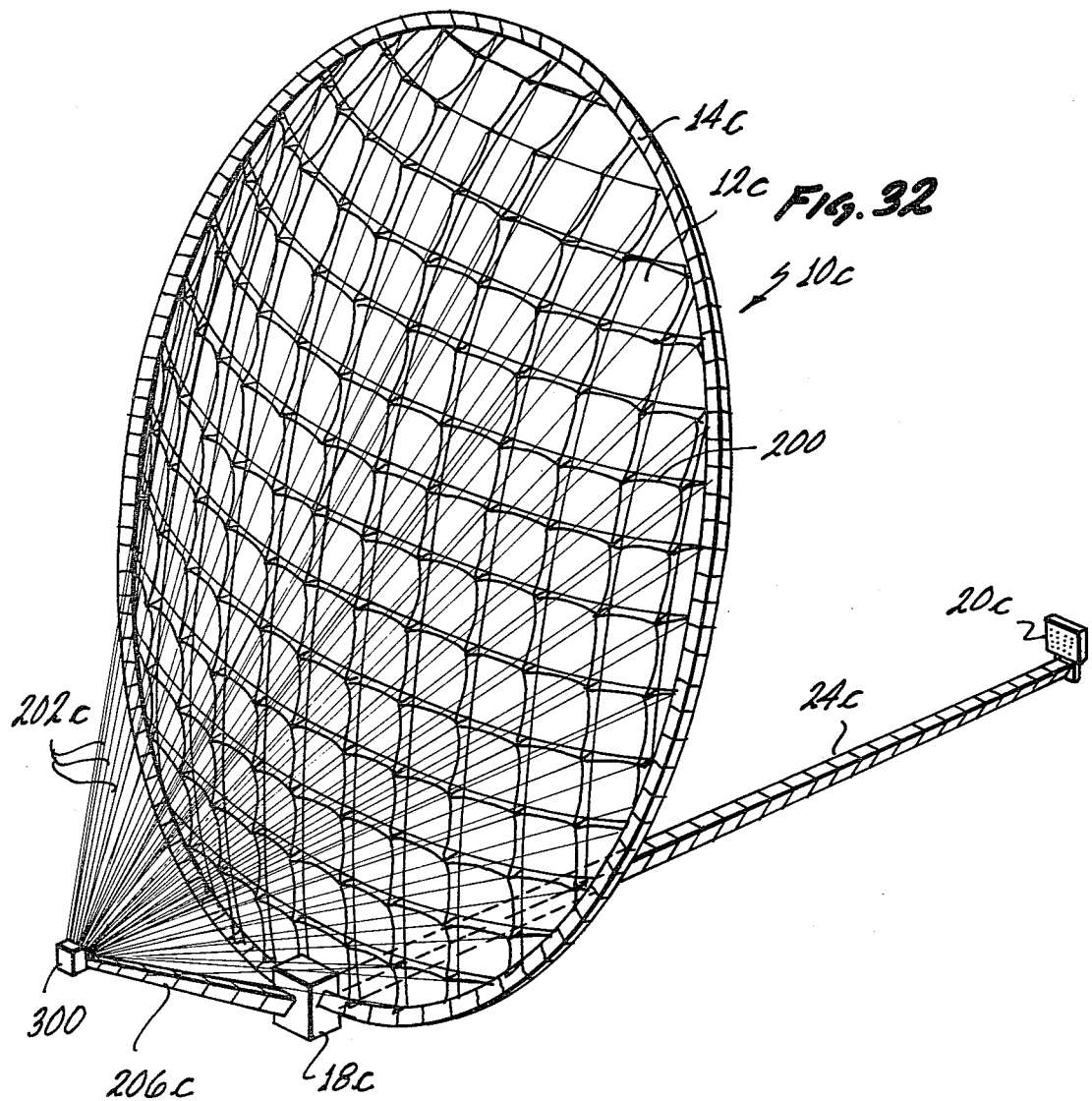
FIG. 32 is a deployed paraboloidal antenna formed by the panel sets which are triangular in cross-section when deployed.
Figure 33:
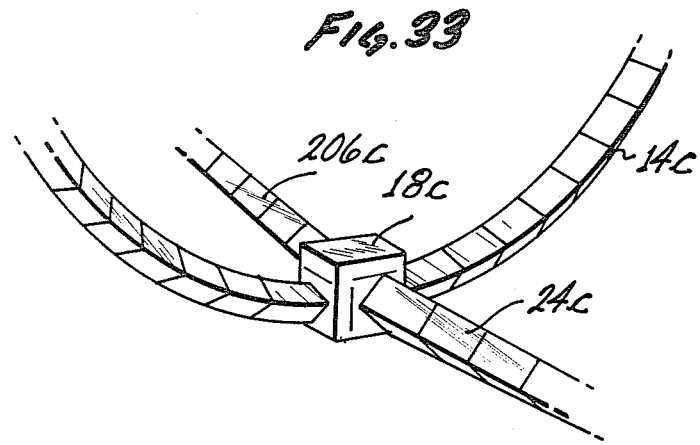
FIG. 33 is a partial view of FIG. 32 with parts of the antenna removed to show the basic structural arrangement of the panel sets deployed from the canister.
Figure 37:
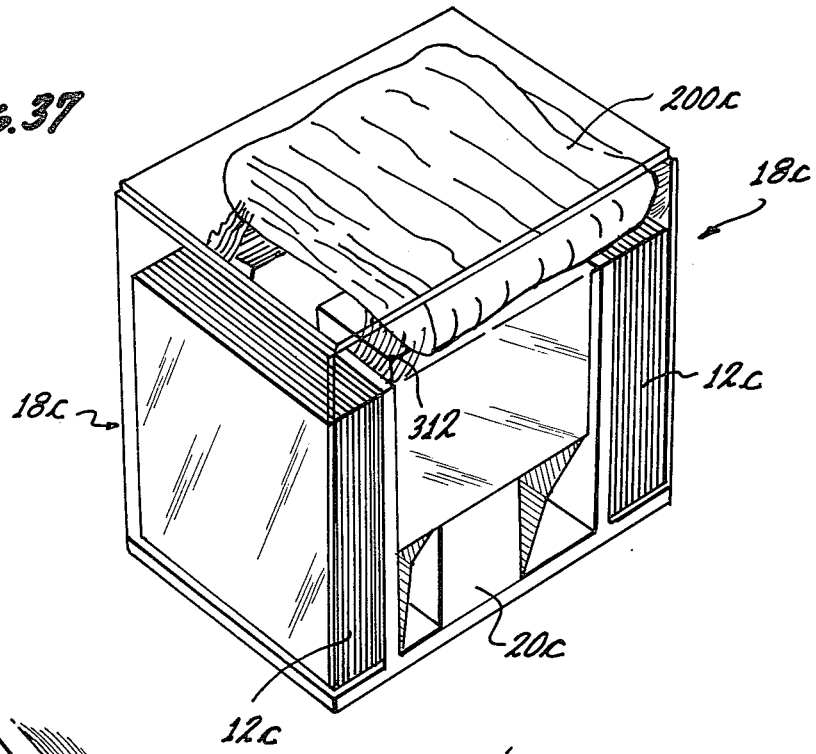
FIG. 37 is a perspective view like FIG. 34 with the panels for the rim, back and feed booms and the wire mesh reflector surface of the antenna shown stored in the storage container.

Referring now specifically to FIG. 32, there is illustrated a fully deployed antenna 10c of the offset (asymmetrical) paraboloidal type with a rigid outer planar ring 12c, a back boom 206c, and a feed boom 24c with a signal feed device 20c. The back boom has a plurality of guy (back) wires 202c gathered and held on the outer end of the boom by a tensioning device 300. The guy wires are attached at their opposite ends to a reflector 200c of wire mesh with control and adjustment of the reflector surface being accomplished by the tensioning device since the ends of the guy wires are connected to the intersections or interconnections of the wires forming the reflector surface mesh. The reflector surface, while connected to the ring 14c, is controlled by the tensioning device, and thus, the stability of the reflector surface is not dependent on the wire mesh itself for rigidity.

The panel sets for the outer ring, back boom, feed boom, the back wires and the reflector mesh are all packaged in a multi-compartment storage container or canister 18c for transfer into orbit with the canister forming part of the antenna structure in its deployed form. This latter feature is shown more clearly in FIG. 33 where only partial view of the antenna is shown. Again, although not shown, suitable attitude control means are located on the feed support boom and the ring 14c as well as on the container 18c as in the case in the prior embodiments.

FIGS. 34–37 show the storage container or canister 18c as being provided with a plurality of compartments sometimes called canisters with first and second compartments 302 and 304 for the storage of the panel sections for the ring 14c. These compartments open outwardly and are separated by a web or wall 306 to define additional compartments—a relatively large front compartment 308 and a relatively narrow back compartment 310. The front compartment 308 stores the feed boom 24c and the feed array 20c and the smaller back compartment 310 stores the guy wires 202c, the guy wire tensioning device 300 and the panel sets for the back boom 206c. The reflector screen 200c and suspension devices (wires) 312 for connecting the screen to the ring are placed on top of a ring panel set compartment and on top of the latter is a ring coupling panel 314. The coupling panel also acts as a cover for the top of the canister and finally, all of the elements of the antenna form walls to make a closed canister with all the hinge lines between the panel set forming the circular ring 14c being parallel to each other.

Figure 38:
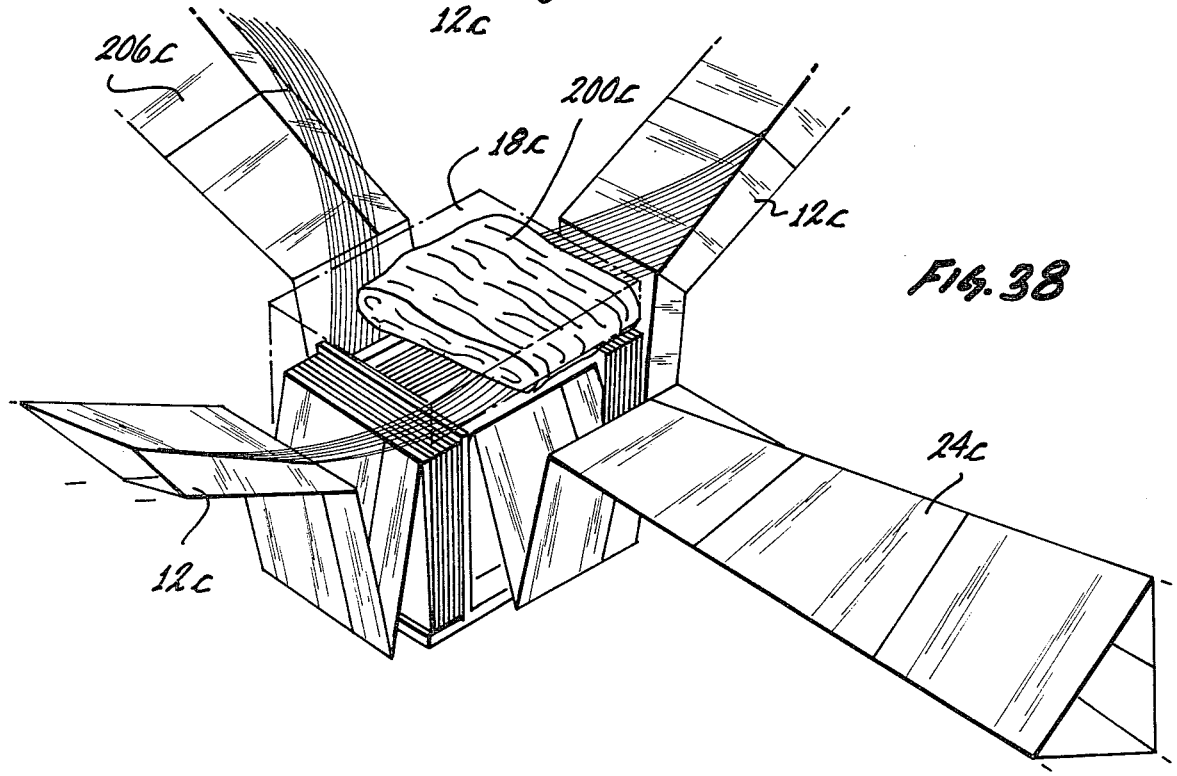
FIG. 38 illustrates the different parts of the antenna starting to deploy.

Shown schematically in FIG. 38 are the various panel sets being expanded out of their respective compartments with the back boom 206c pulling the guy wires 202c from their compartment and the ring panel sets pulling the attached wire mesh reflector screen 200c. The manner in which the ring is expanded is simplistically shown in FIGS. 39A–D and 40, beginning with the completely stored antenna elements FIG. 39A, with the coupling panel opening upwardly and the remainder of the ring opening outwardly from the canister, FIG. 39B. The further steps of deploying the ring panel sets from the canister are represented further by the FIGS. 39C, 39D and 40 where the latter illustration represents the ring sets immediately before being fully deployed and the outer illustration represents the completely deployed ring. Note in this antenna, the tether wires of the prior embodiment are not used but in lieu thereof the coupling panel 314, stowed in the top side of the container, is directed outwardly and upwardly away from the canister and is not fully opened up or deployed until the final stage. As noted in FIG. 38, the panel sets form a ring or booms, as the case may be, that are triangular in cross-section as they are gradually deployed from the canister. How this is accomplished will be described in connection with FIGS. 41–46.

FIG. 41 shows a typical truss construction using isogrid type panels (which correspond to that of FIGS. 7, 19 and 20 of the prior embodiment including nodes of FIG. 25) except that, in this instance, the panel sets, when deployed, form a rigid truss construction, triangular in cross-section.

FIG. 42A is a schematic illustration of the manner in which the panel sets of FIG. 41 are folded stowed in the canister and unfolded when deployed. In this Figure, the panels are identified by their edges or hinge line numbers, 1,2 and 3 since they are each hinged longitudinally with hinge panel 1-3 being provided with a central longitudinal hinge, line 4, so that it may fold into the other two panel sets. Thus, the two halves comprising panel 1-3 first folds inwardly as represented by the dotted lines and arrow towards panels 1-2 and 2-3 with panel 2-3 moving about hinge line 2 towards panel 1-2 as indicated by the dotted line and arrow. When deployed, the opposite movement takes place as indicated by the solid lines and arrows.

In order to accomplish this movement, the panel sets are provided with nested hinges and lock out mechanisms, illustrated only schematically in FIGS. 42B–D, will be described in more detail in connection with later figures. Thus, panels 1-2 and 2-3 are provided with nested hinges 318 (four shown) located on one end thereof at the isogrid connections or crossovers with one nested hinge located on edges 1,2 and 3 while the remainder of the hinges identified as 320 are conventional.

Panel 1-2 is a rigid panel. Panel 2-3 is a flexible panel also having conventional hinges along lines 2 and 3 and with nested type hinges aforesaid. When stowed, panel 2-3, being a flexible panel, provided edge 3 with maximum deformation while edge 2 receives no deformation.

Panel 1-3 is also a flexible panel with hinge line 3 receiving maximum deformation as stated in connection with panel 2-3, with edge 1 receiving no deformation. This panel 1-3 differs also from the other panels in that one end, corresponding to the end containing the nested hinges, has no hinges and there is an additional hinge line 4 centrally located and parallel to the other hinge line 1 and 3. This panel 1-3 is also provided with cap lock out mechanism along hinge line 4 which will be shown in more detail.

From the foregoing, it can be seen that the axial flexiblity of panels 1-3 and 2-3 allows the necessary axial compression or extension of these panels relative to panels 1-2 such that panels 1-3 and 2-3 can be forced into essentially the same plane as panels 1-2. The panel sets comprising panels 1-2, 2-3, and 1-3 in one plane being hinged to each other by means of the compound hinges, are now capable of being folded in accordian-like fashion with respect to each other into packages that fit the assigned cannisters compartments. All panels 1-2, 2-3 and 1-3 are coupled by hinges to equal panels in contiguous panel sets forming the circular or straight booms.

The above mentioned cap lock mechanisms at each grid node along hinge line 4 are illustrated in FIGS. 43A and B. This is an illustration of panel 1-3 and along hinge line 4 with partial but enlarged illustration of the isogrids. It is noted that one edge of the grid member 324 of the isogrid panel is disconnected and spaced in a portion slightly below the hinge line but each of the two disconnected portions are again toggled by linkages 326. These linkages are spring actuated by leaf springs 328 which are preloaded in a direction tending to force the grid members apart. This preloaded spring or open toggle lock condition is shown in FIG. 43A where the two ends of the grid members abut each other whereas in FIG. 43B the links are in the lock position with the grid members held apart.

The torque shaft system 330 shown in operative position in FIG. 43B comprises a torque shaft 340 and a torque tube 342 attached together at one end of the isogrid members 344 and seated in a holder 346 and bolted as at 348. The torque tube 342 forms a sleeve for the torque shaft 340. The torque shaft 340 is attached at the other end to the male member 350 of isogrid panel 352 forming panel 4-3. The male member 350 and shaft 340 form the hinge line 4 with the female bifurcation 354 A and B of the grid member 344 of panel 1-4. As shown the torque tube 342 terminates in leg 354B of the bifurcation. Thus, the torque shaft 340 and torque tube 342 are attached at 356, the torque tube 342 is attached to leg 354B at 358 and torque shaft 340 and male member 350 are attached at 360. Otherwise, there is rotational freedom between the torque tube and the bifurcation of panel 1-4, between the torque shaft and the torque tube, and between the torque tube and holder 346. Thus, the torque shaft and tube are torsionally preloaded such that their induced rotational action actuates the panels 1-4 and 4-3 into a coplanar deployed state. Rotational stops (not shown) limit the maximum relative rotation of panels 1-4 and 4-3 to 180° or to a coplanar state from a parallel planar state. Enough torsional preload is provided to hold the panels in a deployed state against possible operation or environmental loads that tend to rotate panels away from their deployed state.

The purpose of the cap lock mechanism and torque shaft drive system is to permit the panels to have sufficient freedom or play without undue stress in a stowed state yet to lock the truss panel sets in the deployed state.

Figure 44:
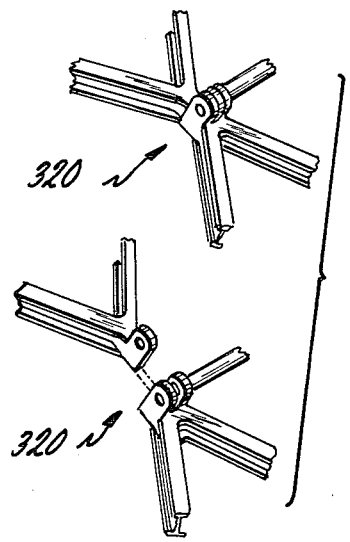
FIGS. 44-46 show nested hinges and alternate lock out mechanisms.
Figure 45:
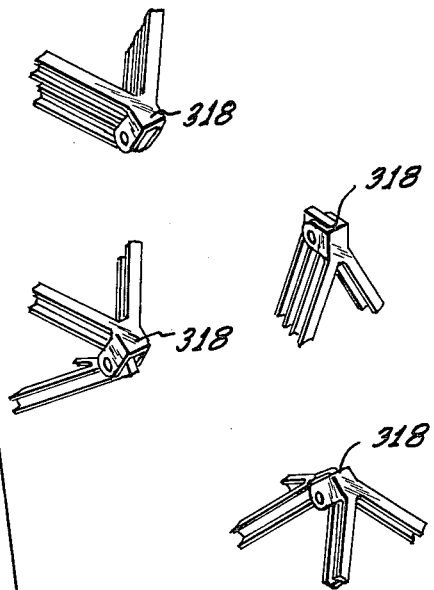

FIGS. 44-45 are various views of nestable hinges that were discussed in connection with FIGS. 43A-D. These hinges have their respective male and bifurcated portions and of sufficient length to permit the panel sets to be double panel folded with its adjacent panel set as described in connection with the simplified illustration in FIG. 42A, and so that adjacent (i.e., prior and subsequent) panel sets can be placed in their respective compartments contiguously and so that, when deployed, connect such prior and subsequent panel sets together to form a truss.

Figure 46:
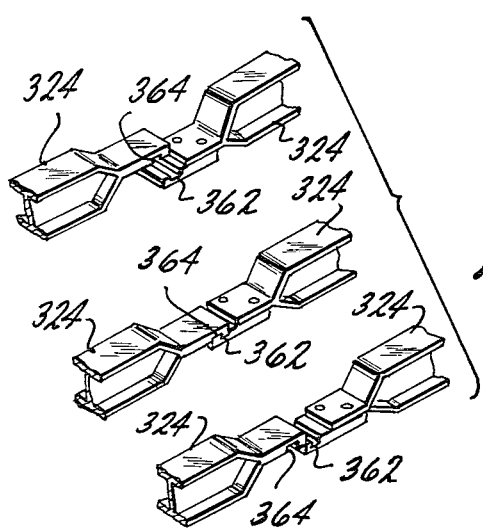

Also disclosed in FIG. 46 is an alternative to the grid member axial lock out mechanisms shown in FIGS. 43A and B where one isogrid member 324 is provided with a transverse slot 362 which engages a mating second transverse slot 364 in the corresponding colinear grid member 324 in a tongue-and-groove relationship. As shown in FIG. 46, the members are locked out when in a forshortened position although the same principle could be used to have the members 324 locked out in the extended postion as it is in FIG. 43. Manuevering to achieve lock out would be similar to that of FIG. 43 except that if the lock out is in the forshortened position, the panels 1-3 and 2-3 (see FIG. 42) would have to be on the inside diameter of the boom ring. Then, the rigid panels 1-2 would be on the outside diameter (see FIG. 40).

Turning now to FIGS. 47 and 48, the manner of transporting antenna structures in canisters 18c into orbit and utilized on a geostationary platform 370 is illustrated. The two cansisters 18c are shown atop legs 372 forming the platform and which are propelled into space by a suitable space vehicle 374. When in space, the legs 372 are expanded (unfurled) and the antennas are deployed from their respective canisters as illustrated in FIG. 49.

Thus, it can be seen that two of the antennas of the type described can be integrated with a foldable truss geostationary platform and packaged in a space vehicle for transfer into orbit. The packaged and deployed sizes are approximately 30 meter antenna diameters and the payloads for the unused platform are not shown but could be incorporated in space available on both sides of the stowed antennas.

From the foregoing also, it can be seen that there is disclosed an antenna structure deployed from a canister without the use of a tether mechanism or deployment linkages as in the prior embodiments. The alignment of the panel sets is an inherent part of the panel sets themselves and thus deployment linkages are not needed. In the case of the ring, the panel sets are directed to form such a ring by the coupling panel set. Also, in the case of the antennas being attached to the geostationary platform, attitude control can be a part of the geostationary platform itself or by thrusters attached to the antennas themselves as described in prior embodiments.

Fourth Embodiment—A horn or cornucopia antenna utilizing panel sets which are triangular in cross-section when deployed.

Figure 51:
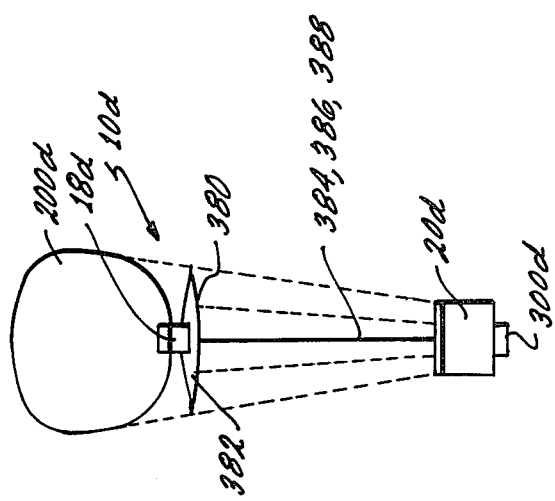
FIG. 51 is a front elevational view of the antenna of FIG. 50.
Figure 50:
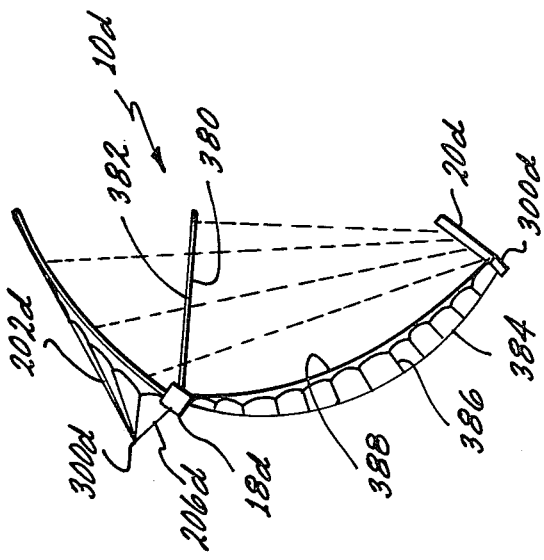
FIG. 50 is a side view of a deployed cornucopia antenna formed of panel sets which are triangular in cross-section when deployed.

FIGS. 50 and 51 illustrate a deployed cornucopia antenna 10d capable of being fully stowed in a canister 18d, transported into space, and formed of panel sets which are triangular in cross-section when deployed. Again, in this embodiment, where practical, the antenna elements performing the same function as in the prior embodiments will be given the same reference numerals but with a suffix d to simplify the description of the invention.

This canister 18d, however, differs slightly from the prior described canisters in that compartments with panel sets to be deployed exist on all sides of the canister (as distinguished from the canister 18c where one side, the bottom side, as viewed in FIGS. 34-37, contained no panel sets). The ring 14d, with its reflection screen 200d, guy wires 202d and back boom 206d, are deployed as described above.

The feed array, however, of this antenna has an additional ring 380 deployed and located at the focal point of the reflector which point is also the throat of the horn feeding it. The manner of deploying this additional ring 380 with its reflector surface 382 is the same as described in FIGS. 39 and 40 above for the deployment of ring 14c. The two rings share the oppositely facing compartments of the canister since the two rings are needed for both the reflector and horn exit and use the canister as part of their respective rings. A third curvilinear boom 384 supports a multi-horn feed 20d. The boom 384 is deployed from the canister along with its guy wires 386 and harness 388 to control and define the curvature of boom 384 and is deployed together with a tension control device 300d in a manner as described above. The sole difference being that in this embodiment the curvature of a boom is controlled instead of the curvature of a reflector screen. The suspended wire mesh surfaces required for both the reflector and the horns are compatable with the operating radio frequency and backlobe and sidelobe requirements.

Since the storage and deployment of the panel sets to form the components of this feed horn antenna are described above, no further description thereof is deemed necessary.

Fourth Embodiment (continued—Solar panel utilizing panel sets which are triangular in cross-section when deployed.

FIG. 52 illustrates one solar array 400 comprising four truss panel assemblies—two horizontal and two vertical truss panels 402-408 framing a solar panel assembly 410. Truss panels 402-408 are formed of panel sets which, when deployed, are triangular in cross-section and are packaged for transportation into orbit in a canister such as 18e and deployed therefrom in a manner taught in connection with the prior embodiments. The solar panel assembly comprises panel sets of relatively thin blanket type material 412 for holding solar panels 414 but likewise folded and stored in the canister and deployed by and at the time of deployment of the truss panels. The solar panels are, of course, smaller than the area of the blanket panels sets to fold properly for storing.

The canister 18e is illustrated in FIGS. 53 and 54 and comprises two elongated compartments 416 and 418, shown vertical in these figures, and two short transverse compartments 420 and 422 shown horizontally, with all compartments emanating from, and attached to, a central compartment 424. The panel sets forming the two horizontal trusses 402 and 404 are stored in the two long vertical compartments and the panel sets for forming the vertical trusses 406 and 408 are stored in the short horizontal compartments. The central compartment 420 stores the double folded solar panel assembly 410.

Canister 18e, while performing the function of storing the panel sets and solar panel assembly and forming a part of the final configuration, as in the case of the prior canister, differs in that it separates its compartments during deployment to provide the proper connection of the various trusses as will be clear from a more detailed description hereinafter. The canister is also provided with corner elements such as 426 of the same contour as the canister to form corner structures for reinforcement of the frame.

FIG. 55 illustrates the top truss panel 402 and the lower truss panel 404 being deployed from the canister. The manner of deployment is the same as described in connection with the prior embodiments. However, in this instance, the compartment 422 storing the vertical frame truss panel 408 disconnects from the canister and is carried on the initial panel set deployed from the canister. Compartment 420, containing the other vertical truss panel 406, remains as part of the canister at this time.

At the same time the top and bottom truss panels are being deployed, the double folded solar panel arrays are also being deployed from the canister. The solar panel sets are folded differently from the truss panel sets and thus the first fold moves horizontally as shown in the drawing at 428 while the nested hinge connection of the panel sets moves vertically as at 430. Suitable attachments, 432 located on parts of the solar array folds, connect the solar array to the truss panels and deploy the solar array with the deployment of the truss panels.

This is the first unfolding of the solar array. The second unfolding of the solar array will be accomplished upon the deployment of the vertical truss panels.

When the first and second horizontal truss panels are fully deployed, the vertical truss panels begin their deployment. At this time, the vertical truss panels are now located at each end of the deployed horizontal truss panels and thus serve to further unfold the solar array.

Figure 56:
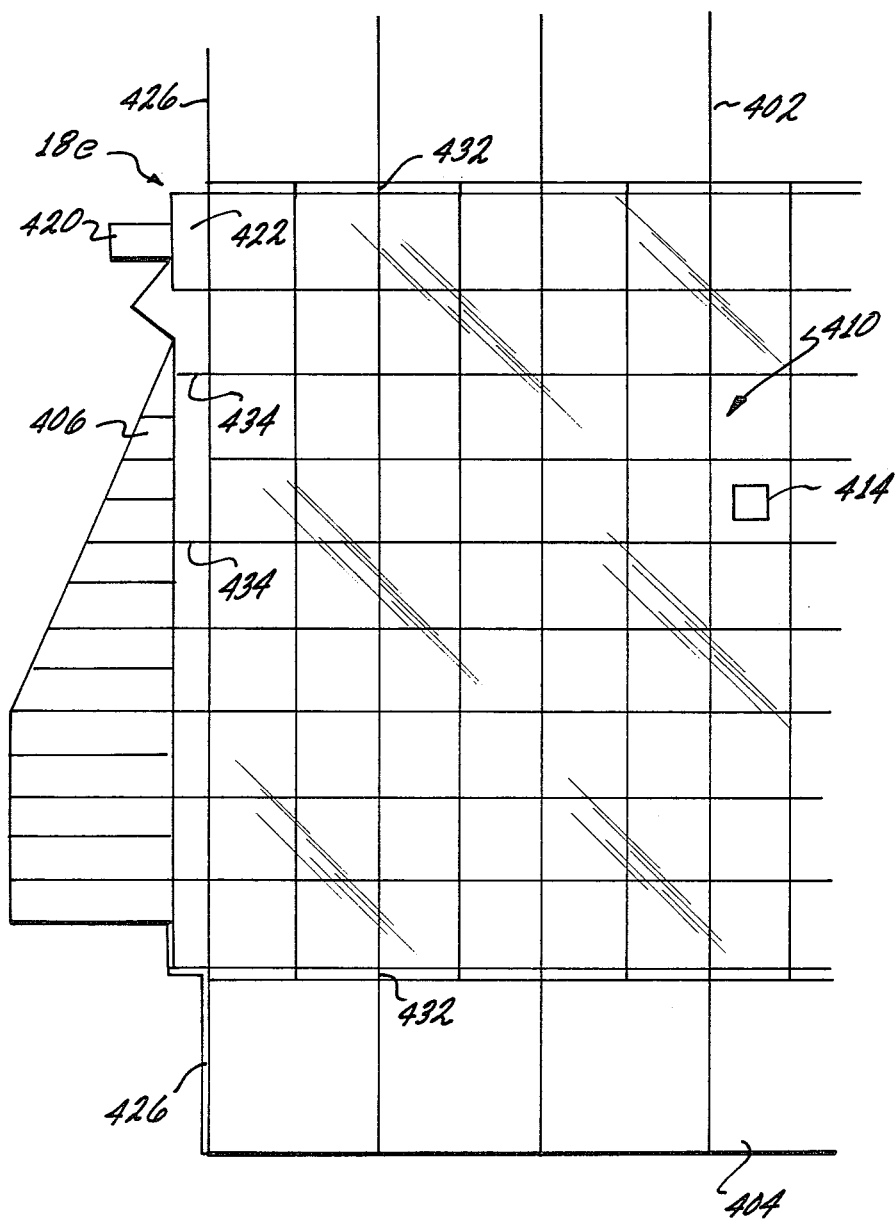
FIG. 56 illustrates a portion of the deployed horizontal and vertical truss panels forming the solar panel.

FIG. 56 illustrates the portion of the deployed vertical truss panels shown unfolding from the compartment 420, gradually expanding as taught in the prior embodiments, and being attached at selected positions to the solar blanket by connectors 434 (as seen every second fold) serves to unfold the solar array. Note the initial or first deployed vertical panel also deployed the corner structure 426, previously mentioned, which serves as a part of the frame extended from the canister, while the canister itself and its compartment serves as the corner frame for the first horizontal panel. A similar corner structure is provided for the other vertical truss panel to provide a complete frame.

Each framed solar panel is mounted on a solar blanket as aforesaid, and of course a suitable wiring and wiring harnesses are provided and are deployed with the truss panels and solar panels for utilizing the solar panels in an operative manner.

The above described solar array 400 is actually one of several solar panels which are unfolded in the same manner and are connected together in an orbit assembly operation, although deployed individually, to provide an array of megawatt capability such as shown in FIG. 57. Such a large solar array comprising, as illustrated, seven solar arrays may have its own propulsion system comprising main and vernier thrusters 436 and 438 and suitable attitude control devices (not shown).

Again, the material for the construction of the array as in the prior embodiments may be selected from suitable material such as aluminum or graphite epoxy, in solid or isogrid form.

Fifth Embodiment—Pantograph deployment means for panel sets which form a panel truss which is triangular in cross-section when deployed.

This embodiment of the invention is directed to panel sets using a different deployment mechanism than in prior embodiments for truss panels which become triangular in cross-section, when deployed.

In order to understand this embodiment, FIGS. 58–60 should be viewed together.

FIG. 58 illustrates a plurality of panel sets 500 capable of being stowed in any of the previously described canisters but with a plurality of end connected levers 502 forming a pantograph 504 with the mid portion 506 of each lever pivotally connected to the ends of adjacent panel sets. When actuated the pantograph expands to deploy the panels as shown in FIG. 59. This is the first stage of deployment. In this figure the adjacent but deployed panel sets are still flat even though the pantograph has expanded them from the stacked position of FIG. 58.

Note, that now taking FIGS. 59 and 60 together, each panel set can be seen to comprise a first panel 1-2, a second panel 2-3 hinged at line 2 to panel 1-2, and a third panel 3-1 hinged to panels 1-2 and 2-3 at hinge lines 2 and 1, respectively. Panel 3-1 is provided with an additional hinge line 4 midway between hinge line 3 and 1 and the panel is further cut to provide diamond shaped cut outs and triangular panel portions 508, the base of which are at hinge line 3 and hinge line 1 and the apices of which are at hinge line 4 which are folded apex-to-apex and illustrated in FIG. 59.

When the first stage of development is completed, suitable springs 510 are illustrated schematically in FIG. 60, which are biased toward panel deployed position but held constrained until completion of the first stage deployment, cause the second stage deployment to take place. This results in a fully stabilized structure which does not depend on panel flexing to go from a stowed state to a deployed state. The truss structure, as shown in these later figures, is also provided with guy wires 512 which are connected to the apex of each of the triangles, to overcome the spring action to collapse the panels back to the first stage of deployment which will allow the pantograph to retract the panel sets to the stowed state of FIG. 58.

While the structures of the prior embodiments are also retractable they depend to a large extend on the flexure of the panels whereas in this embodiment the panels are not flexed but are stowed unflexed in the stowed state.

Again, the material for the panels, whether solid or of an isogrid configuration, is a matter of choice.

Finally, from the foregoing, it can be seen that, in the broadest sense, there is disclosed a panel and truss system capable of being transported into space in a storage container (canister) to form a space structure and which, when deployed, from the canister define a geometric configuration, whether the panels are circular or triangular in cross section, and whether the configuration is toroidal, parabolic, or rectangular with the canister forming part of the geometric configuration and with means deployed by said panels to fill the space defined by the geometric configuration, such as reflector screens, lens, solar panel blankets and in certain instances additional truss structures are added, such as feed and back booms to form a selected antenna structure.

What is claimed is:

1. An expandable panel/truss system wherein a plurality of panels are alternately folded in an accordian-like stack as panel sets in a storage container for transporting into space for deployment to form space structures, the improvement comprising:
truss means in the form of a ring formed by deployed unfolded panels emanating from said storage container which forms a selected geometric configuration outlining a space;
said storage container forming part of said geometric configuration; and
means folded in said storage containers and unfolded and deployed with said truss means to fill the space outlined by said geometric configuration
said panel sets are panel pairs which when deployed are circular in cross-section.

2. The system as claimed in claim 1 wherein said selected geometric configuration is an aperture and further including:
a first means for connecting said ring to said storage container;
the first and last of said deployed panels being connected to said storage container to form said ring;
a feed support boom formed by said deployed panels emanating from said storage container; and
wherein said folded means forms an antenna lens covering said aperature.

3. The system as claimed in claim 2 wherein said lens is formed by a membrane folded in accordian-like fashion and connected to said ring panels and deployed by deployment of said ring panels.

4. The system as claimed in claim 3 further including deployment linkages for deploying and guiding said panels from said storage container for forming said ring and support boom.

5. The system as claimed in claim 4 further including tethering means for guiding and completing said ring and for holding said ring in engagement with said means for connecting said ring to said storage container.

6. The system as claimed in claim 5 wherein said panels have support racks for aiding in the deployment of said panels, and
brake and dampening means including sprockets engaging said support racks for controlling deployment of said panels.

7. The system as claimed in claim 6 further including indexing and stack advance means for deploying said panels, one pair of said panels at a time from said storage container.

8. The system as claimed in claim 7 wherein said means for connecting said panels to said storage container include expandable truss means stowed for transportation in said storage container and expanded in space to a deployed condition upon deployment of said panels.

9. The system as claimed in claim 8 further including hanger means deployed upon deployment of said ring panels for unfurling said lens within said aperture upon full deployment of said ring panels.

10. The system as claimed in claim 9 further including mounting brackets stowable in said storage container and deployed and positioned at preselected places on said ring upon deployment of said ring panels,
attitude control means on said mounting brackets,
attitude control means on said storage container which together with said attitude control means on said ring, form control means for controlling the attitude of said antenna.

11. The system as claimed in claim 10 further including a second boom formed of deployable boom panels and extending in a direction opposite to said feed support boom and connected to said storage container, and
guide wire means attached at the end of said second boom and to said ring to form said ring into a paraboloid configuration.

12. The system as claimed in claim 11 further including a second boom formed of deployable panels and extending into a direction opposite said feed support boom and connected to said storage container,
a guide screen connected to said deployed ring, and
tensioning means connected to one end of said second boom and to said guide screen for forming said boom into a paraboloid configuration.

13. A system for forming an antenna comprising a plurality of elements stowable in a storage container for transportation into space by a space vehicle and deployable in space from said storage container, the improvement wherein,
some of said stowable elements comprise one half cylinder ring panel pairs hinged at their top and bottom to each other to form when deployed a torus and hinged on both side edges to form a connection to said first panel pairs,
said panel pairs first folded along the side edges with each other and with adjacent panel pairs and then rotated about their top and bottom edge hinges into relatively flat panels under stress and stowed within a canister in said storage container,
the last of said folded panel pairs being the first to emerge from said storage container upon deployment,
the hinge clevises along said side edges nesting with adjacent hinge clevises of adjacent panel pairs to form a single hinge axes when in stowed condition,
means for retaining said folded panel pairs in said storage container,
folded boom panel pairs identical to said ring folded panel pairs stowed in a second canister of said storage container, and
some of said stowable elements comprising means in the form of expandable trusses for connecting said ring panel pairs and said boom panel pairs to said storage container upon deployment of said panels from said storage container.

14. The system as claimed in claim 13 wherein one of said connecting means is stowed first in said storage container and connected to the last to be deployed of said ring panel pairs, a second of said connecting means also stowed in said storage container and connected to the first to be deployed of said ring panel pairs,
a second of said connecting means also stowed in said canister and connected to said first to be deployed ring panel pairs,
means for deploying said ring panel pairs by deploying said panel pairs successively one at a time allowing said panel pairs to assume a circle in cross section and to guide said panel pairs as they are deployed in alignment with said storage container to form said ring and to connect the first to be deployed of said panel pairs to said second connecting means whereby an antenna ring is formed with said container as a part thereof, some of said stowable elements comprising third and fourth connecting means, and said third connecting means being stowed first in said canister adjacent the last to be deployed of said boom panel pairs, said fourth connecting means being stowed in said canister and connected to the first to be deployed of said boom panel pairs.

15. The system as claimed in claim 14 further including means for aligning and guiding said boom panel pairs from said canister to form a feed support boom circular in cross section for supporting an antenna feed and attitude control means at one end thereof centrally located with respect to the center axis of said ring, and other of said stowable elements comprising an antenna lens membrane means folded in accordian like fashion in said storage container and connected to said ring panel pairs for deployment therewith and to form a lens for said antenna.

16. The system as claimed in claim 15 wherein said connecting means further includes means for connecting the first of said ring panel pairs and the last of said ring panel pairs to be deployed to the last of the boom panel pairs to be deployed.

17. The system as claimed in claim 16 further including attitude control means located on said ring panel pairs and on the end of said feed support boom for controlling the attitude of said antenna in space.

18. The system as claimed in claim 17 wherein said deployment means include linkage means connected to said storage container, brake and dampening means on said linkage means, and sprocket means interconnected with said hinge means along said top and bottom of said panel pairs and cooperating with said brake and dampening means to deploy and control the deployment of the first, second, and third of said panel pairs as they emerge from said storage container.

19. The system as claimed in claim 18 wherein another of said stowable elements comprise tethering means, said tethering means being stowed adjacent said second connecting means and connecting the first to be deployed of said ring panel pairs from said storage means to guide the first of said ring panel pairs in a circle and to draw and contain and connect said first of said panel pairs to the second connecting means thus forming a ring.

20. The system as claimed in claim 19 further including means for incrementally releasing said stowed panel pairs one panel pair at a time for engagment by said deployment means.

21. The system as claimed in claim 20 wherein said means for incrementally deploying said panel pairs one at a time comprises dogs located on rotatable lead screw shafts, keyways in said panel pairs, the keyways in each panel pair being oriented 90° from the keyway in each successive panel pair while stowed in said storage container whereby rotation of said lead screw shafts in increments of 90° will clock and release said panel pairs incrementally from said storage container, and means for rotating said lead screw shafts in increments of 90°.

22. The system as claimed in claim 21 further including stack advance means moveable upon rotation of said lead screw shafts for urging said panel pairs from said canister.

23. The system as claimed in claim 1 wherein said panel sets when deployed are triangular in cross-section and wherein said truss means forms a paraboloid and said outlined space is an aperture and further including, means for connecting said paraboloid to said storage container, the last of said deployed panels being connected to said storage container, the first of said deployed panels being the last of said deployed panels to form a triangle in cross-section, a feed support boom formed by deployed panels emanating from said storage container, and wherein said folded means forma a reflector screen covering said aperture.

24. The system as claimed in claim 23 wherein the last of said deployed panels of said paraboloid form the means for guiding and completing the paraboloid to its final configuration.

25. The system as claimed in claim 24 wherein said reflector screen is foled in accordian-like fashion and connected to said paraboloid and deployed by the deployment of said panels.

26. The system as claimed in claim 25 further including a second boom formed of deployable panels and extending in a direction opposite to said feed support boom and connected to said storage container, and guy wire means is attached at one end of said second boom and to said reflector screen to control the contour of said reflector screen.

27. The system as claimed in claim 26 further including tensioning means located at one end of said second boom and to said guy wire means for forming said reflector screen into the desired configuration.

28. The system as claimed in claim 23 further including an additional panel set which when deployed are triangular in cross-section and wherein said truss means forms a ring which outlines an additional space and wherein said additional outline space is an aperture, and wherein the first of said panels to be deployed to form said ring is the last of said panels to be expanded into a triangular configuration in cross-section.

29. The system as claimed in claim 28 wherein said feed support boom is provided with a tensioning device and further including, guy wires connected between said canister and said tensioning device and connected to said feed support boom to control the curvature of said feed support boom.

30. The system as claimed in claim 1 wherein said panel sets when deployed form truss means which is triangular in cross-section and wherein said outline space is a rectangle and wherein said folded means comprises a blanket containing a plurality of solar panels.

31. The system as claimed in claim 30 wherein said truss means comprises four truss panels located at each end of said rectangle and wherein said storage container is separable from its original configuration and forms the corners of said rectangle.

32. The system as claimed in claim 31 wherein the truss means comprises a first pair of said truss means which are deployed first and a second pair of said truss means which are deployed secondly from each end of said first deployed truss means.

33. The system as claimed in claim 32 wherein said storage container is one of a plurality of storage containers and wherein said truss means is one of several truss means linked together to form a plurality of solar arrays.

34. The system as claimed in claim 1 further including deployment means for said truss means said deployment means comprising a pantograph means.

35. An expandable panel/truss system comprising a plurality of panels alternately folded in an accordian-like stack in a storage container for transportation into space for deployment to form space structures, the improvement comprising,
truss means formed by deployed unfolded panels emanating from a storage container to form a selected geometric configuration,
said storage container forming part of said geometric configuration,
one of said panels forming the top cover of said storage container and forming together with said storage container the means for deploying said truss means and defining the geometrical configuration, and
means folded in said storage container and unfolded and deployed with said truss means to fill the space outlined by said geometric configuration.

36. An expandable panel truss system wherein a plurality of panels are alternately folded in an accordian-like stack as panel sets in a storage container for transportation into space for deployment to form space structures, the improvement comprising,
truss means formed by deployed unfolded panels emanating from said storage container to form a selected geometric configuration,
said panel sets being deployed in sets of three and which, when deployed, are triangular in cross section,
one of said sets of three panels being formed of pairs of sub-panels foldable when stored in nested relationship with the other two of the three panels,
deployable hinge means on said folded panels including means to unfold said panels to form said triangular configuration, and
means for locking said sub-panels in deployed unfolded condition.

37. The system as claimed in claim 36 wherein said means for unfolding and locking said sub-panels in unfolded condition comprises a linkage means and torque responsive means.

38. The system as claimed in claim 36 wherein said means for unfolding and locking said sub-panels in unfolded condition comprises spring means actuating said sub-panel hinge means and further including pantograph means for deploying said sets of three panels.

39. The system as claimed in claim 36 wherein said truss panels define a ring and wherein means are folded in a storage container and unfolded and deployed with said truss means to fill the space outlined by a geometric configuration and wherein said folded means forms antenna lens covering the space defined by said geometric configuration.

40. The system as claimed in claim 36 wherein said truss means forms rings for defining an antenna ring and other of said truss means define platforms extendable from said space vehicle.

41. The system as claimed in claim 36 wherein said storage container is separable to form corners for a rectangular configuration and further including means foldable in said storage container and unfoldable with the deployment of said truss means and said storage container separation to form a support within the rectangular configuration for solar arrays.

* * * * *